United States Patent
Albertson et al.

(10) Patent No.: US 8,577,087 B2
(45) Date of Patent: Nov. 5, 2013

(54) ADJUSTING A CONSUMER EXPERIENCE BASED ON A 3D CAPTURED IMAGE STREAM OF A CONSUMER RESPONSE

(75) Inventors: Jacob C. Albertson, Newton, MA (US); Kenneth C. Arnold, Ellicott City, MD (US); Steven D. Goldman, Chesterfield, MO (US); Michael A. Paolini, Austin, TX (US); Anthony J. Sessa, Quogue, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/543,476

(22) Filed: Jul. 6, 2012

(65) Prior Publication Data

US 2012/0271785 A1      Oct. 25, 2012

Related U.S. Application Data

(63) Continuation of application No. 11/622,679, filed on Jan. 12, 2007, now Pat. No. 8,295,542.

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | |
|---|---|---|
| 4,737,847 A | 4/1988 | Araki et al. |
| 5,091,780 A | 2/1992 | Pomerleau |
| 5,103,305 A | 4/1992 | Watanabe |
| 5,109,425 A | 4/1992 | Lawton |
| 5,283,644 A | 2/1994 | Maeno |
| 5,406,491 A | 4/1995 | Lima |
| 5,454,043 A | 9/1995 | Freeman |
| 5,502,803 A | 3/1996 | Yoshida et al. |
| 5,581,276 A | 12/1996 | Cipolla et al. |
| 5,666,157 A | 9/1997 | Aviv |
| 5,691,693 A | 11/1997 | Kithil |
| 5,714,698 A | 2/1998 | Tokioka et al. |
| 5,747,719 A | 5/1998 | Bottesch |
| 5,774,591 A | 6/1998 | Black et al. |
| 5,777,720 A | 7/1998 | Shapiro et al. |

(Continued)

FOREIGN PATENT DOCUMENTS

| | | |
|---|---|---|
| CN | 1655197 A | 8/2005 |
| EP | 0905644A A | 3/1999 |

(Continued)

OTHER PUBLICATIONS

Albertson et al, Notice of Allowance, U.S. Appl. No. 11/622,685, filed Jan. 12, 2007, dated Jul. 2, 2010, 13 pages.

(Continued)

*Primary Examiner* — Vikkram Bali
(74) *Attorney, Agent, or Firm* — David A. Mims, Jr.; Amy J. Pattillo

(57) ABSTRACT

A survey controller receives response records from response processing systems, wherein the response records comprise a selection of response records each identifying a separate response of at least one consumer to a particular stimulus within a consumer environment detected from a three-dimensional movement of the at least one consumer captured within the consumer environment. The survey controller stores response records in a response database. The survey controller calculates, from the selection of response records stored in the response database, statistics associated with the particular stimulus within the consumer environment. The survey controller stores, by the survey controller, the calculated statistics.

19 Claims, 8 Drawing Sheets

(56) References Cited

U.S. PATENT DOCUMENTS

| | | |
|---|---|---|
| 5,880,731 A | 3/1999 | Liles et al. |
| 5,907,293 A | 5/1999 | Tognazzini |
| 5,930,378 A | 7/1999 | Kubota et al. |
| 6,002,808 A | 12/1999 | Freeman |
| 6,028,626 A | 2/2000 | Aviv |
| 6,035,053 A | 3/2000 | Yoskioka et al. |
| 6,049,747 A | 4/2000 | Nakajima et al. |
| 6,072,494 A | 6/2000 | Nguyen |
| 6,080,938 A | 6/2000 | Lutz |
| 6,115,053 A | 9/2000 | Perlin |
| 6,154,558 A | 11/2000 | Hsieh |
| 6,167,381 A | 12/2000 | Swaine et al. |
| 6,181,343 B1 | 1/2001 | Lyons |
| 6,189,790 B1 | 2/2001 | Walter |
| 6,212,510 B1 | 4/2001 | Brand |
| 6,215,890 B1 | 4/2001 | Matsuo et al. |
| 6,256,046 B1 | 7/2001 | Waters et al. |
| 6,295,367 B1 | 9/2001 | Crabtree et al. |
| 6,301,370 B1 | 10/2001 | Steffens et al. |
| 6,421,453 B1 | 7/2002 | Kanevsky |
| 6,526,161 B1 | 2/2003 | Yan |
| 6,540,674 B2 | 4/2003 | Zadrozny et al. |
| 6,577,937 B1 | 6/2003 | Shuman |
| 6,584,375 B2 | 6/2003 | Bancroft et al. |
| 6,674,877 B1 | 1/2004 | Jojic et al. |
| 6,766,036 B1 | 7/2004 | Pryor |
| 6,784,901 B1 | 8/2004 | Harvey et al. |
| 6,788,809 B1 | 9/2004 | Grzeszczuk et al. |
| 6,804,396 B2 | 10/2004 | Higaki et al. |
| 6,859,144 B2 | 2/2005 | Newman et al. |
| 6,975,246 B1 | 12/2005 | Trudeau |
| 7,036,094 B1 | 4/2006 | Cohen et al. |
| 7,039,676 B1 | 5/2006 | Day et al. |
| 7,058,204 B2 | 6/2006 | MacDougall et al. |
| 7,068,843 B2 | 6/2006 | Chang et al. |
| 7,100,818 B2 | 9/2006 | Swaine |
| 7,110,569 B2 | 9/2006 | Brodsky et al. |
| 7,126,496 B2 | 10/2006 | Greene |
| 7,171,024 B2 | 1/2007 | Crabtree |
| 7,224,830 B2 | 5/2007 | Nefian et al. |
| 7,239,239 B2 | 7/2007 | Dobler et al. |
| 7,274,800 B2 | 9/2007 | Nefian et al. |
| 7,284,201 B2 | 10/2007 | Cohen-Solal |
| 7,340,077 B2 | 3/2008 | Gokturk et al. |
| 7,409,373 B2 | 8/2008 | Knagenhjelm |
| 7,433,493 B1 | 10/2008 | Miyoshi et al. |
| 7,463,157 B2 | 12/2008 | Victor et al. |
| 7,602,945 B2 | 10/2009 | Kubo et al. |
| 7,636,456 B2 | 12/2009 | Collins et al. |
| 7,653,213 B2 | 1/2010 | Longhurst et al. |
| 7,720,610 B2 | 5/2010 | Bergfalk et al. |
| 7,725,547 B2 | 5/2010 | Albertson et al. |
| 7,792,328 B2 | 9/2010 | Albertson et al. |
| 7,821,531 B2 | 10/2010 | Yoda et al. |
| 7,840,031 B2 | 11/2010 | Albertson et al. |
| 7,970,176 B2 | 6/2011 | Kutliroff et al. |
| 7,971,156 B2 | 6/2011 | Albertson et al. |
| 7,996,793 B2 | 8/2011 | Latta et al. |
| 8,005,675 B2 | 8/2011 | Wasserblat et al. |
| 8,009,193 B2 | 8/2011 | Zhou et al. |
| RE42,690 E | 9/2011 | Aviv |
| 8,013,729 B2 | 9/2011 | Buehler |
| 2002/0004629 A1 | 1/2002 | Natori |
| 2002/0107741 A1 | 8/2002 | Stern et al. |
| 2002/0118880 A1 | 8/2002 | Liu |
| 2002/0152010 A1 | 10/2002 | Colmenarez |
| 2002/0178440 A1 | 11/2002 | Agnihotri et al. |
| 2003/0026461 A1 | 2/2003 | Arthur Hunter |
| 2003/0058111 A1 | 3/2003 | Lee et al. |
| 2003/0076300 A1 | 4/2003 | Lauper |
| 2003/0081834 A1 | 5/2003 | Philomin et al. |
| 2003/0113018 A1 | 6/2003 | Nefian |
| 2003/0126013 A1 | 7/2003 | Shand |
| 2003/0142068 A1 | 7/2003 | Deluca |
| 2003/0153817 A1 | 8/2003 | Knagenhjelm |
| 2003/0156756 A1 | 8/2003 | Gortuk |
| 2003/0227453 A1 | 12/2003 | Beier et al. |
| 2003/0234347 A1 | 12/2003 | Akagi |
| 2004/0001616 A1 | 1/2004 | Gutta et al. |
| 2004/0032970 A1 | 2/2004 | Kiraly |
| 2004/0098298 A1 | 5/2004 | Yin |
| 2004/0161132 A1 | 8/2004 | Cohen et al. |
| 2004/0193313 A1 | 9/2004 | Cornet et al. |
| 2004/0228503 A1 | 11/2004 | Cutler |
| 2005/0030184 A1 | 2/2005 | Victor |
| 2005/0069852 A1 | 3/2005 | Janakiraman et al. |
| 2005/0083184 A1 | 4/2005 | Bos et al. |
| 2005/0157908 A1 | 7/2005 | Matsugu et al. |
| 2005/0166163 A1 | 7/2005 | Chang |
| 2005/0206610 A1 | 9/2005 | Cordeli |
| 2005/0210419 A1 | 9/2005 | Kela et al. |
| 2006/0013440 A1 | 1/2006 | Cohen |
| 2006/0040679 A1 | 2/2006 | Shikano et al. |
| 2006/0045310 A1 | 3/2006 | Tu et al. |
| 2006/0067573 A1 | 3/2006 | Parr et al. |
| 2006/0071817 A1 | 4/2006 | Greene |
| 2006/0097857 A1 | 5/2006 | Osaka et al. |
| 2006/0098089 A1 | 5/2006 | Sofer |
| 2006/0098737 A1 | 5/2006 | Sethuraman et al. |
| 2006/0181518 A1 | 8/2006 | Shen et al. |
| 2006/0181519 A1 | 8/2006 | Vernier et al. |
| 2006/0182346 A1 | 8/2006 | Yoda et al. |
| 2006/0210112 A1 | 9/2006 | Cohen et al. |
| 2009/0274339 A9 | 9/2006 | Cohen et al. |
| 2007/0041058 A1 | 2/2007 | Disatnik et al. |
| 2007/0063855 A1 | 3/2007 | Maass |
| 2007/0067203 A1 | 3/2007 | Gil et al. |
| 2007/0097234 A1 | 5/2007 | Katayama |
| 2008/0004950 A1 | 1/2008 | Huang et al. |
| 2008/0022365 A1 | 1/2008 | Chae et al. |
| 2008/0040692 A1 | 2/2008 | Sunday et al. |
| 2008/0065468 A1 | 3/2008 | Berg et al. |
| 2008/0068187 A1 | 3/2008 | Bonefas et al. |
| 2008/0084345 A1 | 4/2008 | Rougas et al. |
| 2008/0143895 A1 | 6/2008 | Peterka et al. |
| 2008/0169914 A1 | 7/2008 | Albertson et al. |
| 2008/0172261 A1 | 7/2008 | Albertson et al. |
| 2010/0045797 A1 | 2/2010 | Schofield et al. |
| 2010/0169792 A1 | 7/2010 | Ascar et al. |
| 2010/0312446 A1 | 12/2010 | Schofield et al. |
| 2011/0173146 A1 | 7/2011 | Hnatio |
| 2011/0212770 A1 | 9/2011 | Ocko et al. |
| 2012/0140042 A1 | 6/2012 | Albertson et al. |

FOREIGN PATENT DOCUMENTS

| | | | |
|---|---|---|---|
| EP | 0991011 A | | 4/2000 |
| EP | 1723901 A | | 11/2006 |
| EP | 1723901 A1 | | 11/2006 |
| FR | 2784887 A | | 4/2000 |
| JP | 4165498 A | | 6/1992 |
| JP | 2004-328622 A | | 11/2004 |
| JP | 2005-315802 A | | 11/2005 |
| JP | 2005309965 A | | 11/2005 |
| JP | 2006-127240 A | | 5/2006 |
| JP | 2006-165729 A | | 6/2006 |
| JP | 2008-083933 A | | 4/2008 |
| TW | 484105 B | | 4/2002 |
| TW | 200523728 | | 7/2005 |
| WO | 0002187 A | | 1/2000 |
| WO | 2004108466 A | | 12/2004 |
| WO | 2005027023 A1 | | 3/2005 |

OTHER PUBLICATIONS

Albertson et al, Office Action, U.S. Appl. No. 11/622,687, filed Jan. 12, 2007, dated Aug. 16, 2010, 32 pages.
USPTO Office Action, dated Jun. 25, 2009, In re Albertson (U.S. Appl. No. 11/470,421, filed Sep. 6, 2006), pp. 1-20.
USPTO Office Action, dated Mar. 22, 2010, In re Albertson (U.S. Appl. No. 11/622,690, filed Jan. 12, 2007), 30 pages.
USPTO Office Action, Dated Mar. 30, 2010, In re Albertson (U.S. Appl. No. 11/622,685, filed Jan. 12, 2007, 28 pages.

(56) References Cited

OTHER PUBLICATIONS

PCT Report, PCT/EP2008/050170, mailing date May 8, 2008, 13 pages.
PCT Report, PCT/EP2008/050079, mailing date Jul. 4, 2008, 11 pages.
PCT Report, PCT/EP2008/050117, mailing date Jun. 19, 2008, 10 pages.
Office Action, U.S. Appl. No. 11/622,679, filed Jan. 12, 2007, In Re Jacob C. Albertson, mailing date Jun. 13, 2011, 53 pages.
Notice of Allowance, U.S. Appl. No. 11/622,679, filed Jan. 12, 2007, In Re Jacob C. Albertson, mailing date Feb. 10, 2012, 20 pages.
Notice of Allowance, U.S. Appl. No. 11/622,679, filed Jan. 12, 2007, In Re Jacob C. Albertson, mailing date May 21, 2012, 15 pages.
U.S. Appl. No. 11/622,687, Albertson et al, filed Jan. 12, 2007, Notice of Allowance, mailing date Feb. 23, 2011, 14 pages.
Notice of Allowance, U.S. Appl. No. 11/622,676, filed Jan. 12, 2007, Albertson et al, mailing date May 16, 2012, 34 pages.
Doherty, G.J., "Formal Verification in the Design of Gestural Interaction", Electronic Notes in Theoretical Computer Science, vol. 43, pp. 75-96 (2001).
Albertson et al, USPTO Notice of Allowance, U.S. Appl. No. 11/622,690, filed Jan. 12, 2007, mailing date Sep. 20, 2010, 27 pages.
USPTO Notice of Allowance, dated Dec. 14, 2009, In re Albertson (U.S. Appl. No. 11/470,421, filed Sep. 6, 2006), pp. 1-13.
USPTO Office Action, dated Jan. 15, 2010, In re Albertson (U.S. Appl. No. 11/622,684, filed Jan. 12, 2007), pp. 1-24.
USPTO Office Action, dated Jan. 14, 2010, In re Albertson (U.S. Appl. No. 11/622,693, filed Jan. 12, 2007), pp. 1-23.
U.S. Appl. No. 11/622,676, Albertson et al, filed Jan. 12, 2007, Non-Final Office Action, mailing date Jun. 17, 2011, 63 pages.
Notice of Allowance, U.S. Appl. No. 11/622,676, filed Jan. 12, 2007, Albertson et al, mailing date Dec. 30, 2011, 74 pages.
USPTO Notice of Allowance, dated Apr. 23, 2010, In re Albertson (U.S. Appl. No. 11/622,693, filed Jan. 12, 2007), pp. 1-14.
USPTO Notice of Allowance, dated May 3, 2010, In re Albertson (U.S. Appl. No. 11/622,684, filed Jan. 12, 2007), pp. 1-37.
Office Action, U.S. Appl. No. 11/622,696, filed Jan. 12, 2007, In Re Jacob C Albertson, mailing date Jun. 7, 2012, 78 pages.
"Method for Access Control Via Gesural Verification", IBM Technical Disclosure Bulletin, IBM Corp, New York, US, vol. 36, No. 9B, Sep. 1, 1993, pp. 487-488, 2 pages.
Black, MJ et al, "Recognizing Temporal Trajectories Using the Condensation Algorithm", Automatic Face and Gesture Recognition, 1998, Proceedings from the Third IEEE International Conference on Nara, Japan, Apr. 1998, Los Alamitos CA, USA, IEEE Comuting Society, pp. 16-21, 6 pages.
Alan Yuille, "Computer Vision Systems for the Blind and Visually Disabled", UCLA Dept. Statistics and Psychology, 4 pages, [online], [print accessed on Aug. 18, 2006]. Retrieved from the internet < www.stat. ucla.edu/~yuille/courses/FIAT_Stat19/fiat3.ppt>.
"What is Photosynth", Microsoft Live Labs, copyright Microsoft Corporation 2006, 1 page, [online], [print accessed on Aug. 18, 2006]. Retrieved from the internet <http://labs.live.com/photosynth/whatis/>.
[online], [print accessed on Aug. 18, 2006]. Retrieved from the Internet <http://www.sandia.gov/RADAR/whatis.html>.
"Accelerometer", copyright Wikipedia, 3 pages, [online], [print accessed on Oct. 31, 2006], [last modified on Oct. 24, 2006]. Retrieved from the internet <http://en.wikipedia.org/wiki/Accelerometer>.
Eric Lipton, "Faces, Too are Searched as U.S. Airports Try to Spot Terrorists", 1 page, The New York Times, Aug. 17, 2006.
Final Office Action, U.S. Appl. No. 11/622,696, filed Jan. 12, 2007, In re Albertson, mailing date Mar. 18, 2013, 39 pages.
Notice of Allowance, U.S. Appl. No. 11/622,696, filed Jan. 12, 2007, In re Albertson, mailing date Jul. 12, 2013, 22 pages.

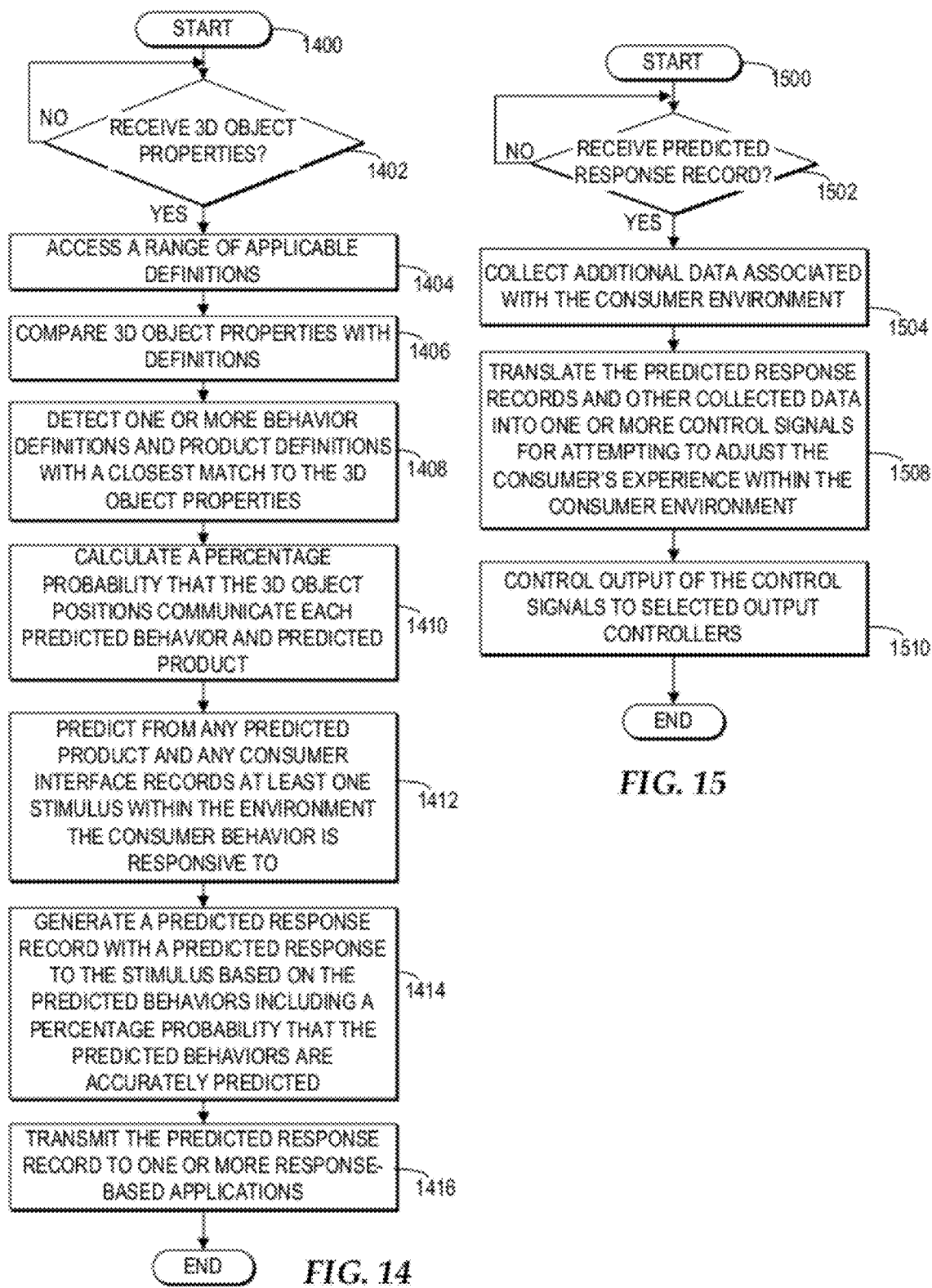

US 8,577,087 B2

ADJUSTING A CONSUMER EXPERIENCE BASED ON A 3D CAPTURED IMAGE STREAM OF A CONSUMER RESPONSE

CROSS-REFERENCE TO RELATED APPLICATIONS

This application is a continuation of commonly assigned U.S. patent application Ser. No. 11/622,679, filed Jan. 12, 2007, which is hereby incorporated herein by reference.

TECHNICAL FIELD

The present invention relates in general to improved behavior identification. In particular, the present invention relates to adjusting, within a consumer environment, the consumer experience within the environment based on a three-dimensional (3D) captured image stream representative of the consumer response to at least one stimulus within the environment.

DESCRIPTION OF THE RELATED ART

Many consumer environments now include multiple different types of computer interfaces specified to request particular types of information from a consumer and specified to provide particular types of products or services to a consumer.

In one example of a computer interface within a consumer environment, many businesses are starting to implement self-service "kiosks" within a store front, where the self-service kiosk is a computer system specifically designed to provide a consumer within a particular product or service within a store environment. For example, kiosks are now implemented in store environments to provide for self-service checkout, self-service registry lookup, and self-service banking.

In another example of a computer interface within a consumer environment, at check-out counters, many businesses now implement an interface accessible to the consumer at which the consumer swipes a credit card, enters security information, provides a signature, and responds to other information requests. Thus, for a consumer to make purchases, the consumer is typically directed through multiple display screens of information, where the consumer must respond to a question on each screen to complete a purchase.

Different consumers may respond to different products and services within a consumer environment, and in particular kiosks or other computer interfaces, in different ways. For example, some consumers may become frustrated or confused when directed to and attempting to use a self-service kiosk within a store. Other consumers, however, may have a more enjoyable shopping experience when those consumers are provided with a self-service kiosk option.

Additionally, with the expansion of on-line shopping, a consumer shopping environment may extend into a consumer's home or anywhere that the consumer accesses a store website via a network connection. On-line store fronts and on-line checkout requirements vary from site to site, often requiring a consumer to learn a new navigation and checkout system for each on-line vendor that a consumer visits.

Some companies who provide computer interfaces within a store environment, will program the software running the computer interfaces to prompt a clerk or a help tool when the software detects the consumer not making selections or making selections in error. For example, at a self-service checkout kiosk in a grocery store, if a consumer swipes a product over a UPC scanner, but does not place the product in a bag, the self-service checkout kiosk alerts a store clerk to the error.

Responding to a consumer using an interface merely based on the selections made by the consumer at the interface is a limited method of monitoring a consumer's experience within an environment. Therefore, in view of the foregoing, there is a need for a method, system, and program product for monitoring actual consumer behavior within an environment, detecting which product, service, or other stimulus the consumer behavior is associated with, and determining what type of response a consumer has to the stimulus within the environment based on the detected consumer behaviors, such that in response to a particular consumer behavior, a clerk may be prompted to intervene, the content displayed on a computer interface may be adjusted, or an additional computer interface may be opened to provide service to a consumer. In particular, there is a need for a method, system, and program product for monitoring consumer behaviors within the environment based on 3D captured image streams, such that consumer behavior is more accurately predicted based on a fine granularity, 3D image stream.

SUMMARY OF THE INVENTION

Therefore, one embodiment of the invention provides improved behavior identification from a three-dimensional captured image. One embodiment of the invention provides for adjusting, within a consumer environment, the consumer experience within the environment based on a 3D captured image stream representative of the consumer response to at least one stimulus within the environment.

In one embodiment, a method, system, and computer program product provide for managing consumer responses within an environment. A survey controller receives response records from response processing systems, wherein the response records comprise a selection of response records each identifying a separate response of at least one consumer to a particular stimulus within a consumer environment detected from a three-dimensional movement of the at least one consumer captured within the consumer environment. The survey controller stores response records in a response database. The survey controller calculates, from the selection of response records stored in the response database, statistics associated with the particular stimulus within the consumer environment. The survey controller stores, by the survey controller, the calculated statistics.

In one embodiment, a computer-implemented method, system, and program product provides for adjusting a consumer experience within a consumer environment. A response processing system captures a three-dimensional movement of the consumer within the consumer environment, wherein the three-dimensional movement is determined using at least one image capture device aimed at the consumer. The response processing system identifies at least one behavior of the consumer in response to at least one stimulus within the consumer environment from a three-dimensional object properties stream of the captured movement. A consumer interaction system detects whether the at least one behavior of the consumer indicates a type of response to the at least one stimulus requiring adjustment of the consumer environment by comparing the type of response indicated by the at least one behavior with a plurality of response rules and identifying at least one particular response rule applicable for the type of response to the at least one stimulus. Responsive to detecting that the behavior of the consumer indicates a type of response to the at least one stimulus requiring adjustment of the consumer environment, the consumer interaction system generates a control signal according to the particular response rule to trigger at least one change of the at least one stimulus within the consumer environment. In capturing the three-dimensional movement of the consumer, the response processing system captures the three-dimensional movement using a stereoscopic image device to identify and track a particular three-dimensional movement. Additionally, in another embodiment, the response processing systems captures the three-dimensional movement of the consumer using at least one stereoscopic image device and at least one sensor enabled device to detect content accessible to a consumer at an interface within the consumer environment, wherein the content is the stimulus within the consumer environment.

In identifying at least one behavior of the consumer in response to at least one stimulus within the consumer environment from a three-dimensional object properties stream, the response processing system calculates a percentage probability that the captured three-dimensional movement represents a particular behavior defined in the behavior definitions. Additionally, in identifying at least one behavior of the consumer in response to at least one stimulus within the consumer environment from a three-dimensional object properties stream, the response processing system identifies at least one of body movement of the consumer, including fine granularity movement such as facial expressions, eye movements, muscle contractions, and changes in skin surface characteristics of the consumer within the three-dimensional object properties stream matching at least one of the plurality of behavior definitions.

In one embodiment, the consumer environment comprises at least one of the consumer within a first selected area including a point of sale terminal, within a second selected area include a display or selection of items within a store, within a third selected area include a kiosk within a store, and accessing an online store interface. The stimulus may include a product selection that a consumer views, picks up, tries on, or otherwise interacts with. Responsive to detecting the consumer within the consumer environment, the response processing system captures the three-dimensional movement of the consumer within the consumer environment.

In generating the control signal, in one embodiment the consumer interaction system generates the control signal according to the particular response rule to trigger a program controller to adjust the content displayed on an interface within the consumer environment. In another embodiment, the consumer interaction system generates the control signal according to the particular response rule to trigger a store attendant system to prompt at least one store attendant within the consumer environment to provide additional aid to the consumer. In yet another embodiment, the consumer interaction system generates the control signal according to the particular response rule to trigger running an additional computer system within the consumer environment to provide a service to the consumer.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 14 is a high level logic flowchart depicting a process and program for response prediction from tracked 3D object properties and consumer interface records; and FIG. 15 is a high level logic flowchart depicting a process and program for applying a predicted behavior record in a response-enabled consumer interaction system.

DETAILED DESCRIPTION OF THE PREFERRED EMBODIMENT

Figure 1:
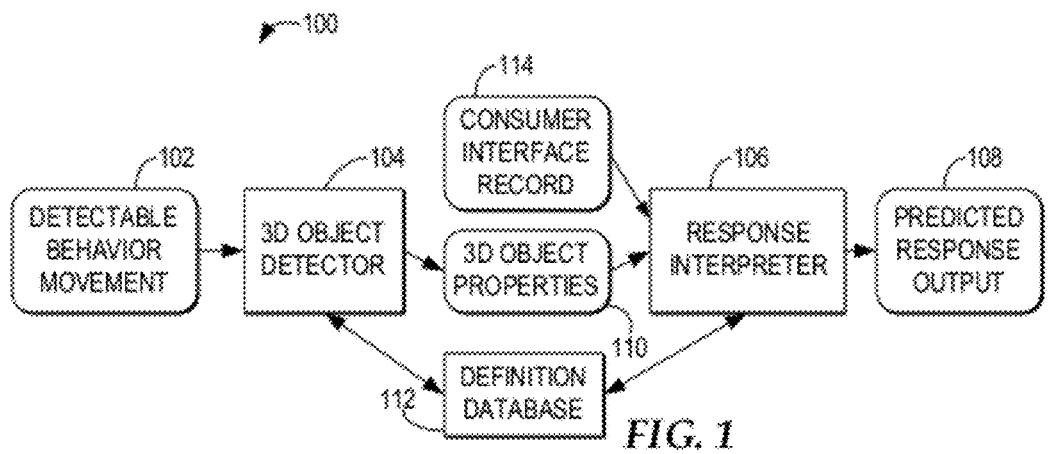
FIG. 1 is a block diagram illustrating a flow of information in a consumer response processing method, system, and program.

With reference now to FIG. 1, a block diagram illustrates a flow of information in a consumer response processing method, system, and program. It will be understood that FIG. 1 provides one embodiment of information flow for capturing image streams within a consumer environment and processing those image streams to predict behaviors of consumers within the consumer environment, to predict the stimulus responded to by consumers within the consumer environment, and thus to predict the behavior based response by a consumer to the stimulus, however, other information flows may be implemented to process captured data and predict behaviors, predict stimulus responded to and therefore predict a response by a consumer to a stimulus within the consumer environment It is important to note that as used throughout, the term "behavior" may include consumer actions typically considered behavior or body language, such as gesturing and facial expressions, and may also include any detectable body movements, body posture, changes in skin surface characteristics such as color, temperature, tone, and level of perspiration, and other types of non-verbal communication. While the embodiment refers throughout to a "consumer", a consumer may include any person interacting with or using a product or service or waiting to use a product or service within a consumer environment. An "environment" or "consumer environment" may include, for example, a selected area in which the user accesses a product or service or waits to access a product or service. A "consumer environment" may include a store location or an online store accessed at a computer system via a network. A "stimulus" may include, but is not limited to, a product, service, store attendant, or other entity within a consumer environment to which a behavioral response by a consumer may be triggered. Detected characteristics of a stimulus, such as a product, may include, but are not limited to, a type of product, a brand of product, a size of product, a price of the product, a composition of the product, the number of times a consumer interacts with a product, and textual information affixed to a product.

In the example, a behavior processing system 100 includes a three-dimensional (3D) object detector 104. 3D object detector 104 represents multiple systems for capturing images and other data about moving and stationary objects, streamlining the captured data, tracking particular objects within the captured movement, streaming the properties of the particular objects, and combining the streamed properties into a three-dimensional representation of the 3D characteristics of the captured objects, as illustrated by 3D object properties 110. 3D object properties 110 may include, but are not limited to, positions, color, size, and orientation, representative of movement by consumers, objects within an environment, and the background identifying attributes of an environment, for example.

In the example, 3D object detector 104 captures images within a focus area, represented as detectable behavior movement 102. Detectable behavior movement 102 may represent all or a portion of a consumer environment. In addition, images within detectable behavior movement 102 may include, but is not limited to, images of a consumer, a store attendant, a product, a service, other entities within a consumer environment, and images not representative of a consumer environment.

In particular, 3D object detector 104 detects detectable behavior movement 102 through multiple types of image and data detection including, but not limited to, capturing video images, detecting body part movement, detecting eye movement, detecting skin texture, detecting skin surface characteristics, and capturing thermal images. For supporting multiple types of image and data detection, 3D object detector 104 may include multiple types of image capture devices, including one or more video cameras arranged for stereoscope video image capture, and other types of sensors for capturing depth characteristics or other types of characteristics of one or more objects. For examples, sensor such as thermal body imaging sensors, skin texture sensors, laser sensing devices, weather detection systems, sound navigation and ranging (SONAR) devices, or synthetic laser or sonar systems, may be implemented. In particular, a sensor may be implemented using a separate sensor unit or may be implemented through a logic unit that operates on a captured image stream. For example, a logic unit may process the captured image stream to detect facial skin textures distinguishable from non-skin textures, such as a smooth wall or textured foliate, within a focus area.

3D object detector 104 translates detectable behavior movement 102 into a stream of 3D properties of detected objects and passes the stream of 3D object properties 110 to response interpreter 106. Response interpreter 106 maps the streamed 3D object properties 110 into one or more behaviors for each consumer and estimates, for each predicted behavior of a consumer, the probability that the actual behavior in detectable behavior movement 102 is correctly predicted by response interpreter 106.

In addition, response interpreter 106 detects what stimulus a consumer is responding to with the predicted behavior. In one example, response interpreter 106 may detect the stimulus responded to from objects detected within 3D object properties 110. In another example, response interpreter 106 may detect the stimulus responded to from a consumer interface record 114 indicating the current content of an interface accessible to a consumer and any inputs by the consumer at the interface.

Further, in one example, 3D object detector 104 includes a sensor enabled to detect the current content of an interface accessible to a consumer and generates consumer interface record 114. In another example, response interpreter 106 receives consumer interface record 114 from a computer program or other sensor in the form of a record of the current content of an interface accessible to a consumer with a time stamp, and response interpreter 106 matches the time stamp of consumer interface record 114 with the same time stamp on 3D object properties 110.

Further, based on the predicted behavior and the product responded to, response interpreter 106 may also predict, with a percentage probability, whether the consumer's response to the stimulus is one that is indicative of a consumer problem. Alternatively, a consumer interaction controller, as will be further described, may determine whether a consumer's response to a stimulus requires attention and control outputs to trigger the required attention.

Response interpreter 106 outputs each predicted behavior, percentage probability that the behavior is correctly predicted, and stimulus responded to in the behavior as predicted response output 108. Response interpreter 106 may pass predicted response output 108 to one or more consumer response-enabled applications at one or more systems.

In particular, in processing detectable behavior movement 102 and generating predicted response output 108, 3D object detector 104 and response interpreter 106 may access a definition database 112 of previously accumulated and stored behavior definitions and stored object definitions to better track and detect, within 3D object properties 110, those monitored objects representative of behaviors, to better recognize consumers separate from other objects within detectable behavior movement 102, to better track and recognize products or services within detectable behavior movement 102, and to better predict the connection between a consumer behavior and a stimulus responded to by a consumer.

Further, in processing behavior movement 102 and generating predicted response output 108, 3D object detector 104 and response interpreter 106 attempt to identify objects representative of monitored user behaviors and to identify objects representative of stimulus and response interpreter 106 predicts the type of behavior in view of the overall interaction in which the behavior is made. Thus, 3D object detector 104 and response interpreter 106 attempt to determine not just a behavior by a consumer, but a level of emphasis included in a behavior that would effect the meaning of the behavior, the stimulus responsive to which the behavior was made that would effect the meaning of the behavior, a background of a consumer making a behavior that would effect the meaning of the behavior, the environment in which the consumer makes the behavior that would effect the meaning of the behavior, combinations of behaviors made together that effect the meaning of each behavior and other detectable factors that effect the meaning of a behavior. Thus, definition database 112 includes behaviors and object definitions corresponding to different types of people, environments, and other factors that may effect the meaning of a behavior. In addition, definition database 112 includes behavior definitions adjusted according to a corresponding facial expression or other corresponding behavior. Further, definition database 112 may be trained to more accurately identify objects representing particular people, animals, places, or things most common within a particular consumer environment.

In addition, in processing behavior movement 102, multiple separate systems of image capture devices and other sensors may each capture image and data about separate or overlapping focus areas from different angles. The separate systems of image capture devices and other sensors may be communicatively connected via a wireless or wired connection and may share captured images and data with one another, between 3D behavior detectors or between response interpreters, such that with the combination of data, response interpreter 106 may interpreter behaviors with greater accuracy.

Figure 2:
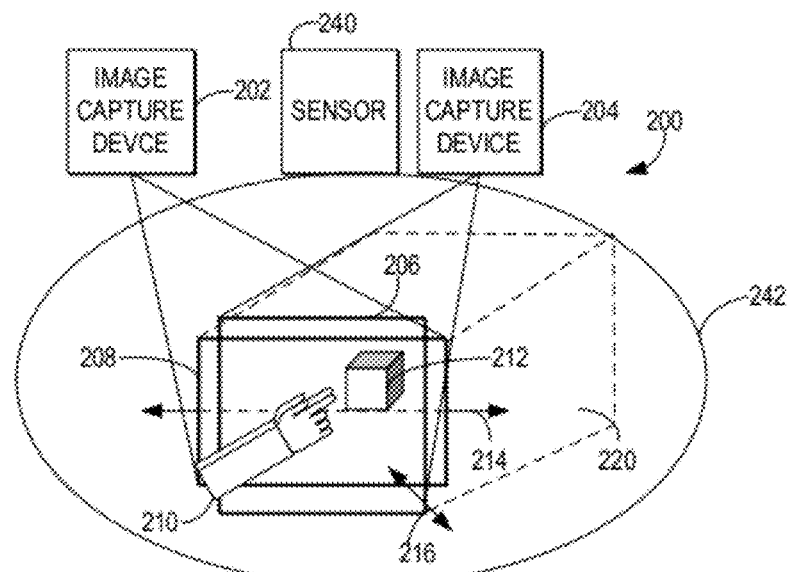
FIG. 2 is an illustrative block diagram depicting an example of an environment in which a 3D object detector captures and generates the 3D object properties representative of captured behavior movement and stimulus within the consumer environment.

Referring now to FIG. 2, an illustrative diagram depicts an example of an environment in which a 3D object detector captures and generates the 3D object properties representative of captured behavior movement and stimulus within a consumer environment. It will be understood that detectable movement environment 200 is one example of an environment in which 3D object detector 104 detects images and data representative of detectable behavior movement 102, as described with reference to response processing system 100 in FIG. 1. Other environments may be implemented in which behavior and other movement indicative of a consumer response to a consumer environment is detected and processed.

In the example, detectable movement environment 200 includes a stereoscopic image device comprising an image capture device 202 and an image capture device 204, each positioned to detect movement of one or more objects, including consumer movement, within a combined 3D focus area 220. In the depicted embodiment, image capture device 202 and image capture device 204 may each be positioned on one stationary axis or separate stationary axis, such that the area represented by 3D focus area 220 remains constantly focused upon. In addition, in the depicted embodiment, image capture device 202 and image capture device 204 and any other sensors may be positioned in parallel, at tangents, or at any other angles to control the span of and capture images within 3D focus area 220.

In another embodiment, image capture device 202 and image capture device 204 may each be positioned on a position adjustable axis or the actual focus point of image capture device 202 and image capture device 204 may be adjustable, such that the area represented by 3D focus area 220 may be repositioned. In one example, each of image capture device 202 and image capture device 204 may be coupled with one or more thermal imaging devices that detect thermal imaging based movement within a broad area and directs the repositioning of the focus area of each of image capture device 202 and image capture device 204 to track the thermal movement within the focus area of each camera.

Further, in the present embodiment, image capture device 202 and image capture device 204 may be affixed to an apparatus that is carried by or worn by a user such as, but not limited to, a consumer or a store attendant. For example, image capture device 202 and image capture device 204 may be affixed to a pair of glasses or other headwear for a user, such that 3D focus area 220 changes as the user moves. In another example, image capture device 202 and image capture device 204 may be affixed to a moving machine, such as a robot, such that 3D focus area 220 changes as the robot moves.

Although not depicted, in another embodiment, only a single video camera, such as image capture device 202, may be implemented as a stereoscopic image device. The single video camera is placed on a track or other adjustable axis and a controller adjusts the position of the single video camera along the track, wherein the single video camera then captures a stream of video images within a focus area at different positioned points along the track and 3D behavior detector 104 combines the stream of images into a 3D object property stream of the properties of detectable objects. In one example, the 3D object property stream can be generated from comparing the changes in luminance and shadowing across the frames as the camera changes in position. Alternatively, a stereoscopic image device may be implemented using a single fixed camera coupled with a sensor that detects depth. In addition, alternatively, a single camera enabled to process images and detect depth from a fixed position may function as a stereoscopic image device. For example, the single camera may process images and detect depth from detecting the movement of a light source and comparing changes in luminance and shadowing across the captured image frames. In particular, the single camera system may first map a model of a monitored user face, focusing on the eyes, mouth, and nose and then detect changes in luminance and shadowing across image frames to detect depth characteristics of the face. In other examples, a system may process a captured stream of video images to extract depth from other characteristics of the stream of images.

For purposes of example, 3D focus area 220 includes a first capture plane 206, captured by image capture device 202 and a second capture plane 208, captured by image capture device 204. First capture plane 206 detects movement within the plane illustrated by reference numeral 214 and second capture plane 208 detects movement within the plane illustrated by reference numeral 216. Thus, for example, image capture device 202 detects movement of an object side to side or up and down and image capture device 204 detects movement of an object forward and backward within 3D focus area 220. It is important to note that when the movement of an object is tracked at a fine granularity, even small adjustments in the body movement such as a raised eyebrow, a jaw thrust forward, a smile, or a frown, of a consumer are tracked and can then be interpreted as indicative of a response by the consumer to a particular stimulus within an environment.

In the example, within 3D focus area 220, a hand 210 represents a moving object and a box 212 represents a stationary object. In the example, hand 210 is the portion of a person's hand within 3D focus area 220. A monitored user may make any number of movements, some representative of behavior in response to box 212 and others responsive to other stimulus, by moving hand 210.

As a person moves hand 210 within 3D focus area 220, each of image capture device 202 and image capture device 204 capture a video stream of the movement of hand 210 within capture plane 206 and capture plane 208. From the video streams, 3D object detector 104 detects hand 210 as a moving object within 3D focus area 220 and generates a 3D property stream, representative of 3D object properties 110, of hand 210 over a period of time.

In addition, a user may move hand 210 in relation to box 212 or another object. For example, a user may point or make another type of behavior directed to box 212. As the user moves hand 210 within 3D focus area 220, the video streams captured by image capture device 202 and image capture device 204 include the movement of hand 210 and box 212. From the video streams, 3D object detector 104 detects hand 210 as a moving object and box 212 as a stationary object within 3D focus area 220 and generates 3D object property streams indicating the 3D properties of box 212 and the 3D properties of hand 210 in relation to box 212 over a period of time.

It is important to note that by capturing different planes of movement within 3D focus area 220 using multiple cameras, more points of movement are captured than would occur with a typical stationary single camera. By capturing more points of movement from more than one angle, 3D object detector 104 can more accurately detect and define a 3D representation of stationary objects and moving objects, including consumer behaviors and stimulus, within 3D focus area 220. In addition, the more accurately that 3D object detector 104 defines a 3D representation of a moving object, the more accurately behavior interpreter 106 can predict a behavior from the 3D model. For example, a behavior may consist of a user making a motion directly towards or away from one of video camera 202 and video camera 204 which would not be able to be captured in a two dimensional frame; 3D behavior detector 104 detects and defines a 3D representation of the behavior as a moving object and behavior interpreter 106 predicts the behavior made by the movement towards or away from a video camera from the 3D model of the movement.

For example, many consumers waiting in a line to checkout may initially appear patient, with little facial expression. Most consumers, however, will start to show signs of impatience through small changes in facial expression. For example, a consumer starting to become impatient may start to purse the consumer's lips more tightly. By capturing, mapping, and tracking a 3D image of the facial expressions and other behaviors of consumers waiting in line at a fine granularity, the adjustment to the amount of pursing of a consumer's lips is detected, such that response interpreter 106 may more accurately map to and predict a detected behavior is pursed lips which is an initial indicator of impatience and more accurately predict when the pursed lips reach a level of tightness requiring additional assistance to the consumer individually or to all consumers by opening an additional check-out location.

In addition, it is important to note that while FIG. 2 illustrates a gesturing hand 210 and a stationary box 212, in alternate embodiments, 3D focus area 220 may include multiple separate consumers store attendants, or stimulus such that image capture device 202 and image capture device 204 capture images of the behavior of multiple people, and 3D object detector 104 detects each behavior by each person as a separate object. In particular, 3D object detector 104 may detect, from the captured video images from image capture device 202 and image capture device 204, behaviors with more motion, such as behaviors made with hands, and behaviors made with less motion, such as facial expressions, to accurately generate 3D object properties of a person's nonverbal communication and interaction with others.

In the example, in addition to capturing images within focus area 220, within detectable movement environment 200, other sensors may detect information relevant to a consumer environment. For example, sensor 240 may detect information within a sensor area 242. Sensor area 242 may overlap, be incorporated within, incorporate, or be separate from focus area 220. 3D object detector 104 combines the sensed information with captured images to more accurately generate 3D object properties 110 and to provide additional information about an environment to a warning system.

In one example, sensor 240 may detect the content displayed to a consumer at a particular interface, detect the particular program or particular program mode running and displayed to a consumer at a particular interface, or detect other types of information about the display and the underlying applications, operating system, network transmissions, hardware, or other components of a system that enables an interface accessible to a consumer. By accessing information about the displayed content or the underlying components of an interface accessible to a consumer, sensor 240 detects information that enables 3D object detector to generate consumer interface record 114. In another embodiment, additional or alternate systems may detect the information for enabling 3D object detector to generate consumer interface record 114.

In one example, sensor 240 may perform facial recognition or other identification recognition from the captured image streams. In one example, sensor 240 may access a database of facial mappings for monitored users and supervising users and identify a particular user facial mapping matching a particular facial mapping from the database. In another example, sensor 240 may analyze the captured image stream for text that may identify a monitored user. For example, sensor 240 may detect a badge number the captured image stream of a badge worn by a monitored user or supervising user. By sensor 240 detecting a user identity, object detector 104 may more accurately generate 3D object properties and response interpreter 106 may more accurately predict types of user behavior from definitions specified for the identified user in definition database 112.

Additionally, in another example, sensor 240 may detect information broadcast from RFID chips placed on items within sensor area 242, where the RFID of an object broadcasts the object type, the object location, and any information associated with the object. By combining sensed information about the location of a particular object with captured images from which the image is identified, object detector 104 may more accurately generate 3D object properties 110 and response interpreter 106 may more accurately distinguish stimulus, such as products, from the behaviors within 3D object properties 110.

In yet another example, sensor 240 may track the relative location of a tracked object within sensor area 242. Although not depicted, sensor area 242 may track a moving object, including a consumer, a product or a service, from a first focus area 220 to a second focus area within sensor area 242. By tracking movement across multiple focus areas, sensor 240 provides additional tracking information of a location of a consumer, a product, or a service so that data gathered in different focus areas can be shared when generating 3D object properties 325. Additionally, sensor area 242 may represent a particular security area, where if motion is detected within sensor area 242, sensor 240 triggers adjustment of focus area 220 to capture the motion-causing entity. Moreover, sensor 240 may detect a changing GPS location of sensor area 242 such that maps or other information associated with a particular GPS location can be accessed and used in generating 3D object properties 110 and consumer interface record 114.

In an additional example, sensor 240 may detect additional information about the weather within sensor area 242. In one example, sensor area 242 may include an area outside a store front and an area within the store location. By detecting the weather, including the temperature, outside a store front and within the store location, sensor 242 detects information that may aid response interpreter 106 in predicting the stimulus of consumer behavior. For example, if a consumer enters a store shivering and sensor 242 provides data indicating a cold temperature outside, response interpreter 106 may interpret behaviors by the consumer in view of the consumer entering the store on a cold day. In another example, where a consumer accesses an online store environment, sensor 242 may be a tool running at the computer system accessing the online store, where the tool detects the current weather for the city or area in which the computer system is located.

In a further example, sensor 240 may detect additional information about the depth, surface area, color temperature or other characteristic of an object to more accurately predict whether the object is representative of a particular behavior and what type of response a consumer has to a stimulus within the consumer environment based on the detected behavior. Sensor 240 may gather independent data about an object or may process the images captured by image capture device 202 and image capture device 204. In particular, by detecting additional information about the depth, surface area, or other characteristic of an object, data collected by sensor 240 is combined with images captured by image capture device 202 and image capture device 204 to generate additional detail and granularity in a 3D object.

Figure 3:
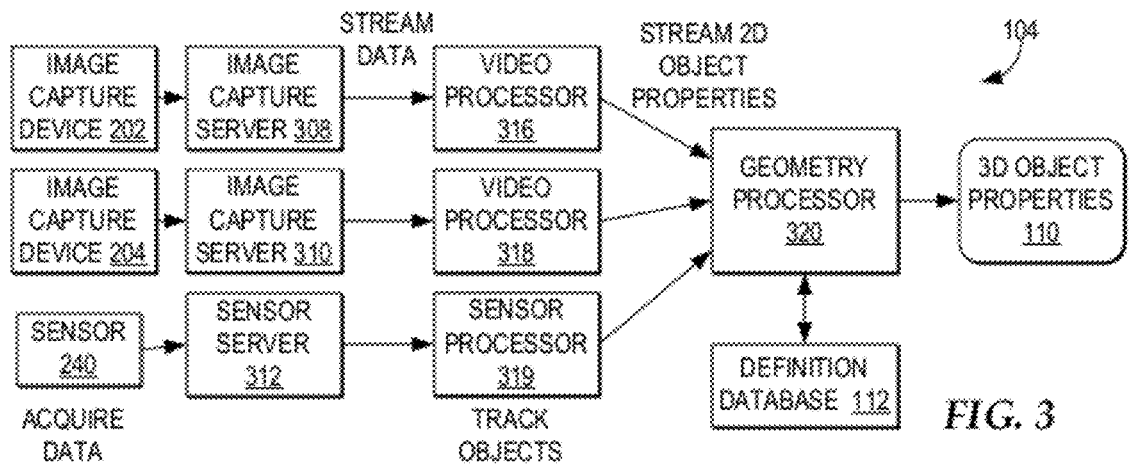
FIG. 3 is a block diagram illustrating one embodiment of a 3D object detector system for generating 3D object properties for enabling a response interpreter to interpret, from 3D object properties, behaviors of consumers in response to one or more stimulus within a consumer environment.

With reference now to FIG. 3, a block diagram illustrates one embodiment of a 3D object detector system for generating 3D object properties for enabling a response interpreter to interpret, from 3D object properties, behaviors of consumers in response to one or more stimulus within a consumer environment. It is important to note that the multiple components depicted within 3D object detector 104 may be incorporated within a single system or distributed via a network, other communication medium, or other transport medium across multiple systems. In addition, it is important to note that additional or alternate components from those illustrated may be implemented in 3D object detector 104 for capturing images and data and generating a stream of 3D object properties 110 and consumer interface record 114.

Initially, multiple image capture devices, such as image capture device 202, image capture device 204 and sensor 240, represent a stereoscopic image device for acquiring the data representative of detectable behavior movement 102 within a 3D focus area and sensor area, such as 3D focus area 220 and sensor area 242. As previously described, image capture device 202 and image capture device 204 may represent video cameras for capturing video images. In addition, image capture device 202 and image capture device 204 may represent a camera or other still image capture device. In addition, image capture device 202 and image capture device 204 may represent other types of devices capable of capturing data representative of detectable behavior movement 102. Image capture device 202 and image capture device 204 may be implemented using the same type of device or different types devices. In addition, the scope, size, and location of the capture area and plane captured by each of image capture device 202 and image capture device 204 may vary.

Sensor 240 may represent one or more different types of sensors as previously described with reference to FIG. 2. In particular, sensor 240 detects information about objects in a particular sensor area that enhances the ability of 3D object detector 104 to create 3D object properties 110 and consumer interface record 114

Each of image capture device 202, image capture device 204, and sensor 240 transmit captured images and data to one or more computing systems enabled to initially receive and buffer the captured images and data. In the example, image capture device 202 transmits captured images to image capture server 308, image capture device 204 transmits captured images to image capture server 310, and sensor 240 transmits captured data to sensor server 312. Image capture server 308, image capture server 310, and sensor server 312 may be implemented within one or more server systems.

Each of image capture server 308, image capture server 310, and sensor server 312 streams the buffered images and data from image capture device 202, image capture device 204, and sensor device 240 to one or more processors. In the example, image capture server 308 streams images to a video processor 316, image capture server 310 streams images to a video processor 318, and sensor server 312 streams the sensed data to sensor processor 319. It is important to note that video processor 316, video processor 318, and sensor processor 319 may be implemented within one or more processors in one or more computer systems.

In one example, image capture server 308 and image capture server 310 each stream images to video processor 316 and video processor 318, respectively, where the images are streamed in frames. Each frame may include, but is not limited to, a camera identifier (ID) of the image capture device, a frame number, a time stamp and a pixel count.

Video processor 316, video processor 318, and sensor processor 319 are programmed to detect and track objects within image frames. In particular, because video processor 316, video processor 318, and sensor processor 319 receive streams of complex data and process the data to identify three-dimensional objects, including objects representing consumers and movement by consumers, and characteristics of the three-dimensional objects, video processor 316, video processor 318, and sensor processor 319 may implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. For example, SPEs may be designed to more efficiently handle processing video streams to identify and map the points of moving and stationary objects within a stream of frames. In addition, video processor 316, video processor 318, and sensor processor 319 may implement other types of processor architecture that enables efficient processing of video images to identify, in three-dimensions, moving and stationary objects within video images from which behavior of consumers and the stimulus to which a consumer responds, can be predicted.

In the example, video processor 316, video processor 318, and sensor processor 319 each create and stream the properties, including positions, color, size, shape, and orientation, of the detected objects to a geometry processor 320. In one example, each processed frame streamed to geometry processor 320 may include, but is not limited to, a camera ID, a frame number, a time stamp, and combinations of two or more of X axis coordinates (x_loc), Y axis coordinates (y_loc), and Z axis coordinates (z_loc). It is important to note that x_loc, y_loc, and z_loc may each include multiple sets of points and other data that identify all the properties of an object. If multiple objects are detected and tracked within a single frame, the X axis coordinates and Y axis coordinates for each object may be included in a single streamed object property record or in multiple separate streamed object property records. In addition, a streamed property frame, such as the frame from sensor processor 319 for a SONAR detected position, may include Z axis location coordinates, listed as z_loc, for example.

Geometry processor 320 receives the 2D streamed object properties from video processor 316 and video processor 318 and the other object data from sensor processor 319. Geometry processor 320 matches up the streamed 2D object properties and other data and constructs 3D object properties 110 and consumer interface record 114 from the streamed 2D object properties and other data. In particular, geometry processor 320 constructs 3D object properties 110 that include the depth of an object. In one example, each 3D object property record constructed by geometry processor 320 may include a time stamp, an object or consumer movement label, X axis coordinates (x_loc), Y axis coordinates (y_loc), and Z axis coordinates (z_loc), and additional information collected from sensors. For example, additional information collected from sensors may include a location identifier received from an RFID or GPS detected location coordinates, weather information, or other sensed information about a consumer environment. In addition, in particular, geometry processor 320 constructs consumer interface record 114 which may include a time stamp, a content type, and other information collected about the interface or underlying system to controlling output at an interface accessible to a consumer.

At any of video processor 316, video processor 318, sensor processor 319, and geometry processor 320 property records may include at least one identifier to enable persistence in tracking the object. For example, the identifier may include a unique identifier for the object itself and an identifier of a class or type of object, including an object identified as consumer movement.

In particular, by video processor 316, video processor 318, and sensor processor 319 identifying and classifying object properties, each of the processors may access definition database 112 for accessing previously processed inputs and behavior mappings to more accurately identify and classify 2D object properties to detect and match the streamed 2D object properties to an object or behavior. In addition, geometry processor 320 may more accurately construct 3D properties of objects based on the streamed 2D object properties, based on previously matched and constructed 3D properties of objects accessed from definition database 112. Further, definition database 112 may store the streamed 2D object properties and 3D object properties for future reference.

In addition, by video processor 316, video processor 318, and sensor processor 319 identifying and classifying object properties and by geometry processor constructing 3D object properties 110, each of the processors may identify detected objects, including behaviors of monitored users. For example, video processor 316, video processors 318, sensor processor 319, and geometry processor 320 may access definition database 112, which includes specifications for use in mapping facial expressions and other body movements, performing facial and other body movement recognition, and performing additional processing to identify an object representing a behavior by a consumer. In addition, video processor 316, video processor 318, sensor processor 319 and geometry processor 320 may access definition database 112, which includes specifications for types of products available within a consumer environment. Further, video processor 316, video processors 318, sensor processor 319, and geometry processor 320 may access definition database 112, which includes specifications for different types of environments for use in identifying a particular environment in which a consumer is located based on detected objects and background. Additionally, in constructing 3D object properties 110, video processor 316, video processors 318, sensor processor 319, and geometry processor 320 may identify multiple detected objects in the environment and therefore identify multiple behaviors of a single consumer, one or more interactions between multiple consumers, or one or more behaviors by a consumer responsive to one or more stimulus. By monitoring and identifying interactions to a stimulus detected in the environment in which the stimulus is located, more accurate prediction of a behavior in the context in which the behavior is made may be performed.

Figure 4:
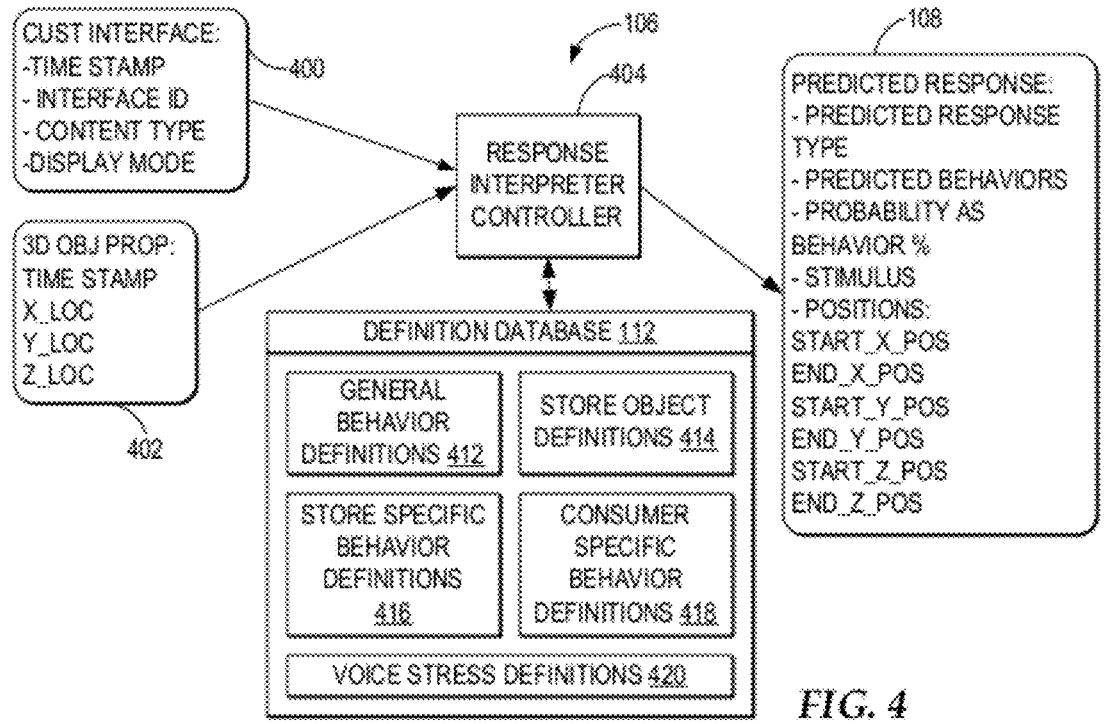
FIG. 4 is a block diagram depicting one embodiment of a response interpreter system.

Referring now to FIG. 4, a block diagram illustrates one embodiment of a response interpreter system. It is important to note that the multiple components depicted within response interpreter 106 may be incorporated within a single system or distributed via a network across multiple systems.

In the example, a 3D properties record 402 includes "time stamp", "x_loc", "y_loc", and "z_loc" data elements. It will be understood that 3D properties record 402 may include additional or alternate data elements as determined by geometry processor 320 of FIG. 3. For example, 3D properties record 402 may include additional information identifying a particular or relative location of a consumer within a sensor area and not just within the focus area, colors, and other data collected by image capture devices and sensors and processed within 3D object detector 104.

In addition, in the example, a consumer interface record 400 includes "time stamp", "interface identifier (ID)", "content type", and "display mode". In the example, an interface ID may include an identifier for a particular interface within a consumer environment or a type of interface, the content type may indicate the specific content, a position within a sequence of content, or other types of content indicators, and a display mode may indicate which mode a consumer views the content within, when multiple modes are available. It will be understood that additional or alternate types of data may be included within consumer interface record 400

Response interpreter 106 includes a response interpreter controller 404, where response interpreter controller 404 may include one or more processors programmed to interpret a behavior by a consumer responsive to at least one stimulus within a consumer environment. For example, response interpreter controller 404 may include a processor with the CellBE architecture, programmed to efficiently process 3D object properties data streams and consumer interface record streams, predict behaviors of consumers from the 3D object properties streams, and predict what product the consumer behavior is in response to within a consumer environment. In addition, response interpreter controller 404 may include processors upon which software runs, where the software directs processing of 3D object properties streams, predicts behaviors of consumers from the 3D object properties streams, and predicts what stimulus within the consumer environment the consumer behavior is responsive to.

In processing 3D object properties streams, consumer interface records, predicting behaviors, and predicting what stimulus the consumer behavior is in response to within a consumer environment, response interpreter controller 404 maps 3D object properties to one or more behavior actions with a percentage probability that the streamed 3D object properties represent the mapped behavior actions and with a percentage probability that the predicted behavior is in response to a particular product within a consumer environment. In particular, response interpreter controller 404 accesses one or more behavior definitions for one or more behaviors and determines whether the 3D object properties match one or more characteristics of one or more behaviors as defined in one or more of the behavior definitions. In addition, response interpreter controller 404 accesses one or more product definitions for one or more products and determines whether the 3D object properties match one or more characteristics of one or more products as defined in one or more of the product definitions. Behavior definitions may include mapped 3D models of one or more types of behaviors. In addition, behavior definitions may define the parameters of identifying characteristics of a behavior including, but not limited to, body part detected, type of movement, surface characteristics, shape, speed of movement, frequency, span of movement, depth of movement, temperature, and color.

In addition, behavior definitions are specified to enable response interpreter controller 404 to determine the overall response by a consumer based on the predicted behaviors. For example, once response interpreter controller 404 determines that an object stream represents a consumer behavior of "pulling eyebrows together" and the consumer is viewing an interface displaying a survey question to the consumer while the consumer is checking out, response interpreter controller 404 is enabled to determine, from definition database 112 that the consumer is confused by the question displayed within the interface. In contrast, if response interpreter controller 404 determines that the object stream represents the consumer behavior of "thrusting jaw forward" and the consumer is viewing the same interface displaying a survey question to the consumer, response interpreter controller 404 is enabled to determine, from definition database 112 that the consumer is angered by the survey question or the presence of the survey question while checking out. Thus, behavior and product definitions may predict a particular response based on the combination of behaviors and the product to which a consumer appears to respond.

It is important to note that in interpreting 3D object properties streams, response interpreter controller 404 performs an aggregate analysis of all the tracked objects in one or more 3D object properties streams identified for a particular focus area by one or more behavior processing systems. In one example, response interpreter controller 404 aggregates the 3D object property streams for a particular focus area and particular sensor area. In another example, response interpreter controller 404 may receive multiple 3D object properties streams from areas overlapping a focus area and sensor area, analyze the 3D object properties streams for similarities, location indicators, and orientation indicators, and construct the 3D object properties streams into a 3D aggregate representation of an area.

In one embodiment, response interpreter controller 404 may map the aggregate of the tracked objects directly into a single behavior definition or a single product definition. In another embodiment, response interpreter controller 404 maps multiple aggregated tracked objects into multiple behavior definitions or product definitions. For example, a person may simultaneously communicate through facial behavior and a hand behavior, where in predicting the actual behaviors communicated through the tracked movement of the facial behavior and hand behavior, response interpreter controller 404 analyzes the 3D object properties of the facial behavior in correlation with the 3D object properties of the hand behavior and accesses behavior definitions to enable prediction of each of the behaviors and to enable prediction of whether the behaviors, in combination, represent a particular predicted response to a particular product. In another example, response interpreter controller 404 may aggregate and analyze multiple behaviors response to multiple products to detect a pattern of a consumer stopping to feel or pick up a particular brand, type, or composition of product.

In the example, response interpreter controller 404 accesses behavior definitions and product definitions from definition database 112, which includes general behavior definitions 412, store object definitions 414, store specific behavior definitions 416, consumer specific behavior definitions 418, and voice stress definitions 420 It will be understood that definition database 112 may include additional or alternate types of behavior, object, and voice definitions. In addition, it is important to note that each of the groupings of behavior, object, and voice definitions illustrated in the example may reside in a single database or may be accessed from multiple database and data storage systems via a network.

General behavior definitions 412 include behavior definitions for common behaviors and factors for determining what type of response a behavior is typically representative of within a consumer environment. For example, general behavior definitions 412 may include behaviors definitions for common behaviors, such as a person pointing, a person waving, a person nodding "yes" or shaking one's head "no", or other types of common behaviors that are generally associated with particular types of responses within a consumer environment, but could represent other types of responses depending on the context. For example, within a general consumer environment, a person shaking one's head "no" generally indicates a response of "do not want", however, additional factors such as the speed at which the person shakes and whether the person's eyebrows are raised are also detected and effect the levels of detection effect whether the person's head shake could indicate a different type of response to a product, such as a lack of understanding of a product.

Store object definitions 414 include object definitions for products and other elements within a particular consumer environment. For example, store object definitions 414 may include the object definitions for each type of product and service within a consumer environment such that response interpreter 404 may more accurately identify products and services within a particular store environment from 3D object property streams.

Store specific behavior definitions 416 include behavior definitions specific to the store environment or response-enabled application to which predicted response output 108 will be sent. For example, in the present embodiment, predicted response output 108 may be output to a response-enabled application incorporated into a store attendant notification system that provides audio and other types of notification to store attendants to aid consumers, wherein store specific behavior definitions 416 includes selected behavior definitions focused on the types of behaviors as responses to products that would be relevant for the store attendant notification system. In another example, in the present embodiment, predicted response output 108 may be output to a response-enabled application incorporated into a consumer interface controller that adjusts the display of content within the interface, wherein store specific behavior definitions 416 includes selected behavior definitions focused on the types of behaviors as responses to stimulus that would be relevant for determining whether to adjust content based on consumer behavior.

In one example, in detecting consumer responses within a restaurant for controlling notifications to wait staff within the restaurant, store specific behavior definitions 416 may specify types of behaviors indicative of a consumer ready and waiting for a wait staff. For example, store specific behavior definitions 416 may include definitions to enable response interpreter controller 404 to detect, for a consumer sitting at a table, a number of glances by the consumer around a restaurant, indicators of a hand motion signaling the consumer is ready to order, or an amount of time expired since a consumer stopped looking at a menu, where each of these behaviors separately or in combination may indicate a consumer waiting for a wait staff to come to the table.

In another example, in detecting consumer responses within a department store for controlling notifications to store attendants to adjust product displays or suggest a product to a consumer, for example, store specific behavior definitions 416 may specify types of behaviors associated with products within the store triggering response by a store clerk. For example, in addition to identifying a particular product from an object definition in store object definitions 414, store specific definitions 416 may include definitions to enable response interpreter controller 404 to detect a number of glances by a consumer towards a product before the consumer picks up the product or a number of times a consumer picks up a product before the consumer leaves the product or places the product in a basket. In another example, based on store specific definitions 416, response interpreter controller 404 may detect a number of times and a length of time a consumer looks at a price tag or other textual information affixed to a product and any behaviors indicative of a consumer's response to the price, such as hesitation or dropping the product. In yet another example, based on store specific definitions 416, response interpreter controller 404 may detect whether a consumer breaks a product, attempts to remove a portion of a product or behaves in a manner indicative that the consumer may attempt to take the product without payment. By tracking consumer hesitation, reading of product information, revisiting products or areas of a store, irregular behavior indicative of breaking or stealing and other responses by a consumer to one or more products in a store, consumer responses are gathered and can be provided to a store attendant as a summary of a consumer's activity or in an alert to a store clerk to attend to a consumer or clean a mess. Additionally, consumer responses to a product may be gathered to evaluate whether consumer responses match a predicted response and whether consumers understand how to use a product.

Consumer specific behavior definitions 418 include behavior definitions specific to a consumer. In one example, response interpreter controller 404 accesses an identifier for a consumer from the consumer presenting scannable identification, such as from a unique consumer login code or a consumer credit card. In another example, response interpreter controller 404 accesses an identifier for a consumer from comparing an attribute of the consumer detected by 3D object detector 104, with a database of user attributes. For example, response interpreter controller 404 may perform facial or voice recognition. It will be understood that response interpreter controller 404 may perform other types of identity access and authentication of a consumer.

Further, within the available definitions, a definition may be associated with a particular area of movement or a particular depth of movement within a 3D focus area. In particular, the three-dimensional focus area in which movement is detected may be divided into three-dimensional portions, where movements made in each of the portions may be interpreted under different selections of behavior definitions. For example, one three-dimensional portion of a focus area may be considered an "active region" where movement detected within the area is compared with a selection of definitions associated with that particular active region, such as a region within a particular distance of a checkout line, a kiosk, a product display, or other points within a consumer environment.

Additionally, definition database 112 may include voice stress definitions 430. Voice stress definitions 430 include definitions for levels of voice characteristics including, but not limited to, volume, clarity, and speed, where particular levels of voice characteristics are associated with behaviors. For example, an elevated, rapid voice characteristic may indicate or correlate with behaviors indicating a consumer is frustrated or angry in response to a particular product within a consumer environment. By combining detected voice samples of a consumer, as gathered by sensor 240, for example, and comparing the voice samples with voice stress definitions 430, response interpreter controller 404 may more accurately predict behaviors from 3D object streams where matching voice stress definitions add to the predicted probability and therefore more accurately predict a response by a consumer to a stimulus within a consumer environment.

The behavior, object, and voice stress definitions included within definition database 112 may be added to or adjusted based on user feedback of a consumer, store attendant, or other user. For example, definition database 112 may learn additional behavior, object, and voice stress definitions and adjust the parameters of already learned behavior, object, and voice stress definitions through a store attendant responding to a consumer based on predicted response record 108 and the store attendant indicating whether the predicted consumer response is correct, in a similar manner as a speech recognition system is trained, to more accurately map and predict behaviors, objects, and voice stress in general, within different context, specific to applications, and specific to particular consumers and particular consumer environments.

Response interpreter controller 404 may output predicted response output 108 in the form of one or more response records, such as response record 420. Response record 420 indicates at least one "response type", "predicted behaviors", "probability % as each behavior", and "stimulus". In addition, response record 420 includes the start X, Y, and Z axis properties and ending X, Y, and Z axis properties of the each detected behavior and stimulus, indicative of the location, direction of movement, and speed of movement of the behavior and stimulus, listed as "start_x_pos", "end_x_pos", "start_y_pos", "end_y_pos", "start_z_pos", "end_z_pos". Although not depicted, response record 420 may also indicate the X, Y, and Z axis start and ending properties of general consumer movement, indicative of the location, direction of movement, and speed of movement of the consumer. Further, additional information acquired from sensors, such as RFID data, GPS coordinates, skin surface characteristics, weather conditions, and other sensed data, may be associated with a particular behavior record or included in a separate object record.

In passing response record 420, response interpreter controller 404 may filter out particular types of response records. For example, response interpreter controller 404 may determine which types of responses should be passed to a particular response-enabled application.

Figure 5:
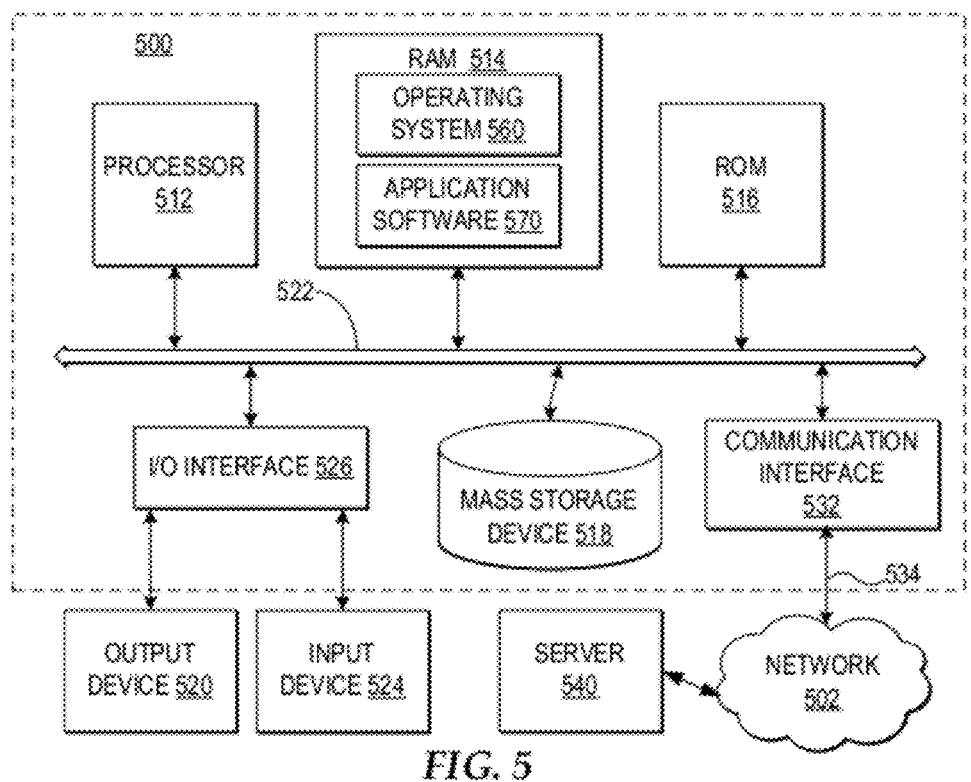
FIG. 5 is a block diagram illustrating one embodiment of a computing system in which the present invention may be implemented.

With reference now to FIG. 5, a block diagram depicts one embodiment of a computing system in which the present invention may be implemented. The controllers and systems of the present invention may be executed in a variety of systems, including a variety of computing systems, such as computer system 500, communicatively connected to a network, such as network 502.

Computer system 500 includes a bus 522 or other communication device for communicating information within computer system 500, and at least one processing device such as processor 512, coupled to bus 522 for processing information. Bus 522 preferably includes low-latency and higher latency paths that are connected by bridges and adapters and controlled within computer system 500 by multiple bus controllers. When implemented as a server, computer system 500 may include multiple processors designed to improve network servicing power. Where multiple processors share bus 522, an additional controller (not depicted) for managing bus access and locks may be implemented.

Processor 512 may be a general-purpose processor such as IBM's PowerPC™ processor that, during normal operation, processes data under the control of an operating system 560, application software 570, middleware (not depicted), and other code accessible from a dynamic storage device such as random access memory (RAM) 514, a static storage device such as Read Only Memory (ROM) 516, a data storage device, such as mass storage device 518, or other data storage medium. In one example, processor 512 may further implement the CellBE architecture to more efficiently process complex streams of data in 3D. It will be understood that processor 512 may implement other types of processor architectures. In addition, it is important to note that processor 512 may represent multiple processor chips connected locally or through a network and enabled to efficiently distribute processing tasks.

In one embodiment, the operations performed by processor 512 may control 3D behavior detection from captured images and data for a consumer environment, behavior prediction from the detected behaviors, and control of output to store attendants or systems within a consumer environment in the operations of flowcharts of FIGS. 12-15 and other operations described herein. Operations performed by processor 512 may be requested by operating system 560, application software 570, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 500 cause computer system 500 to perform a process according to the present invention. The terms "computer-readable medium" or "machine-readable medium" as used herein refers to any data storage medium that participates in providing instructions to processor 512 or other components of computer system 500 for execution. Such a data storage medium may take many forms including, but not limited to, storage type media, such as non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other data storage medium from which computer system 500 can read and which is suitable for storing instructions. In the present embodiment, an example of a non-volatile medium is mass storage device 518 which as depicted is an internal component of computer system 500, but will be understood to also be provided by an external device. Volatile media include dynamic memory such as RAM 514.

In one example, where processor 512 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. A communications interface 532, coupled to bus 522, provides a two-way data communications coupling to a network link 534 (e.g. a modem or network connection) that may be connected, for example, to a local area network (LAN), wide area network (WAN), or directly to an Internet Service Provider (ISP), for communicating with another computer, such as server 540. In particular, network link 534 may provide wired and/or wireless network communications to one or more networks, such as network 502. Further, although not depicted, communication interface 532 may include software, such as device drivers, hardware, such as adapters, and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Network link 534 and network 502 both use electrical, electromagnetic, or optical signals that carry digital data streams. The signals through the various networks and the signals on network link 534 and through communication interface 532, which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, a body scanning system, a keyboard, a mouse, or other input peripheral device, communicatively enabled on bus 522 via I/O interface 526 controlling inputs. In addition, for example, an output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
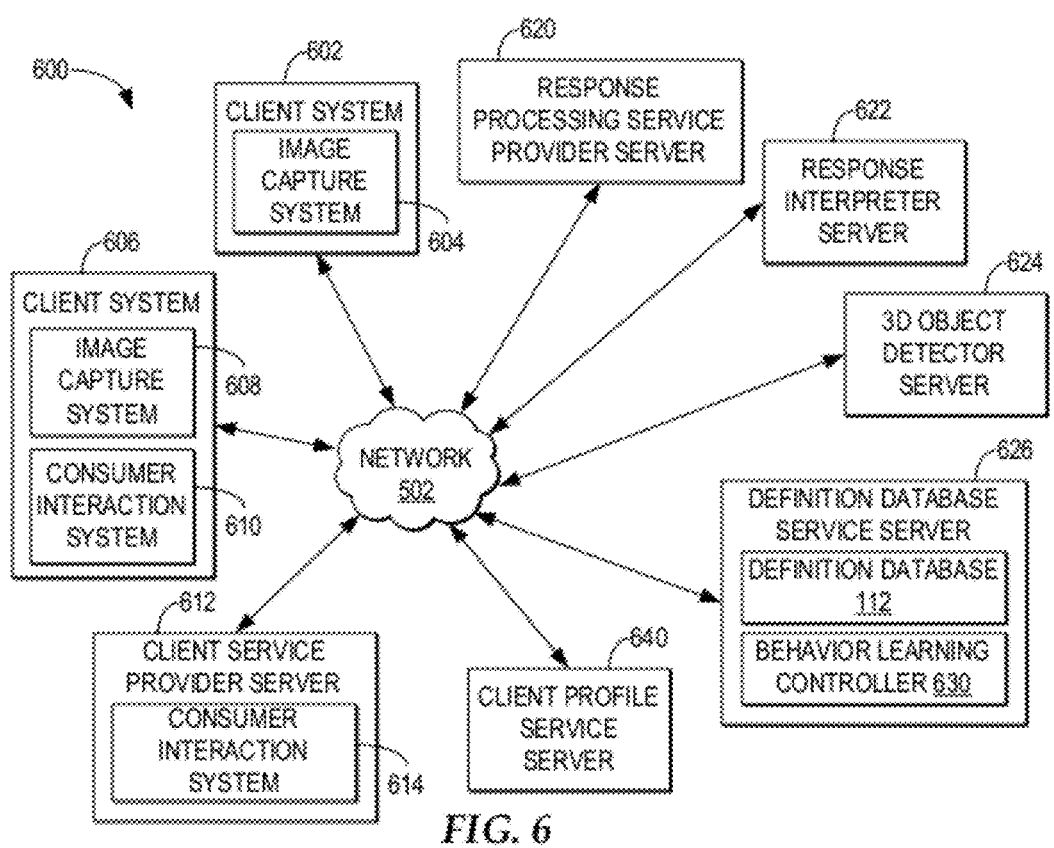
FIG. 6 is a block diagram depicting one example of a distributed network environment in which a response-enabled method, system, and program may be implemented.

Referring now to FIG. 6, a block diagram depicts one example of a distributed network environment in which a response-enabled method, system, and program may be implemented. It is important to note that distributed network environment 600 is illustrative of one type of network environment in which the response-enabled method, system, and program product may be implemented, however, the response-enabled method, system, and program product may be implemented in other network environments. In addition, it is important to note that the distribution of systems within distributed network environment 600 is illustrative of a distribution of systems; however, other distributions of systems within a network environment may be implemented. Further, it is important to note that, in the example, the systems depicted are representative of the types of systems and services that may be accessed or request access in implementing a response processing system and a response-enabled system. It will be understood that other types of systems and services and other groupings of systems and services in a network environment may implement the response processing system and response-enabled system.

As illustrated, multiple systems within distributed network environment 600 may be communicatively connected via network 502, which is the medium used to provide communications links between various devices and computer communicatively connected. Network 502 may include permanent connections such as wire or fiber optics cables and temporary connections made through telephone connections and wireless transmission connections, for example. Network 502 may represent both packet-switching based and telephony based networks, local area and wide area networks, public and private networks. It will be understood that FIG. 6 is representative of one example of a distributed communication network for supporting a response processing system and response-enabled system; however other network configurations and network components may be implemented.

The network environment depicted in FIG. 6 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, distributed network environment 600 includes a client system 602 with an image capture system 604 and a client system 606 with an image capture system 608. In one example, image capture systems 604 and 608 are stereoscopic image devices implementing one or more image capture devices, such as image capture devices 202 and 204, and may include one or more sensors, such as sensor 240. Image capture systems 604 and 608 capture images and other data and stream the images and other data to other systems via network 502 for processing. In addition, image capture systems 604 and 608 may include video processors for tracking object properties, such as video processor 316 and video processor 318, described with reference to FIG. 3 and a geometry processor for generating streams of 3D object properties, such as geometry processor 320, described with reference to FIG. 3.

In one example, each of client system 602 and client system 606 may stream captured image frames to one or more object detection services. In one example, a response processing service provider server 620 provides a service that includes both an object detector service, such as 3D object detector 104, for processing streamed images and other data and a response interpreter service, such as response interpreter 106, for predicting a type of behavior, predicting a probability that the captured images represent the predicted type of behavior, and predicting, based on the behaviors, a response by the consumer to a particular stimulus within the consumer environment, and controlling output of the predicted response records to one or more other systems accessible via network 502.

As to response processing service provider server 620, different entities may implement a response processing service and different entities may access the response processing service. In one example, a user logged into one of client systems 602 or client system 606 may subscribe to the response processing service. In another example, an image capture system or a particular application requesting response processing may automatically stream captured images and data to the response processing service. In yet another example, a business or other entity may implement the response processing service in a communications network.

In another example, each of client system 602 and client system 606 may stream captured frames to a 3D object detector server 624. 3D object detector server 624 receives captured images and other data from image capture systems, such as image capture system 604 or image capture system 608, and processes the images and other data to generate 3D object properties of detected behaviors, for output to a response interpreter system, such as response interpreter server 622 or response processing service provider server 620. In additional or alternate embodiments, an object detector service may be implemented within one or more other systems, with one or more other services performed within those systems. In particular, in additional or alternate embodiments, an object detector service may be implemented within a client system at which the images and other data are captured.

Each of the server systems described may be distributed across one or more systems. In addition, each of the server systems may be distributed across systems with 3D image processing power, including processors with the CellBE architecture programmed to perform efficient 3D data processing. In one example, an entity, such as a business or service provider, may implement separate server systems for object detection and behavior interpretation, wherein multiple response interpreter servers are implemented with each response interpreter server processing different types of 3D object properties.

Response processing service provider server 620, response interpreter server 622, and 3D object detector server 624 may locally store a definition database, such as definition database 112, of raw images, 3D behavior properties, behavior definitions, object definitions, and voice stress definitions, for example. In addition, response processing service provider server 620, response interpreter server 622 and 3D object detector server 624 may access a definition database service server 626 that facilitates definition database 112. As previously described, definition database 112 may include, but is not limited to, raw images and data, 3D behavior properties, behavior definitions, object definitions, voice stress definitions and object predictions.

In addition, definition database service server 626 includes a behavior learning controller 630. Behavior learning controller 630 prompts users to provide samples of particular types of behaviors responsive to a particular stimulus and prompts users to indicate whether a predicted type of behavior matches an actual behavior by the consumer to the particular stimulus. In addition, behavior learning controller 630 gathers other information that enables behavior learning controller 630 to learn and maintain behavior information in definition database 112 that when accessed by object detector services and response interpreter services, increases the accuracy of generation of 3D object properties, the accuracy of prediction of behaviors, and the accuracy of prediction of a consumer response to a stimulus based on the behaviors from 3D object properties by these services.

Further, response processing service provider server 620, response interpreter server 622, 3D object detector server 624, or definition database service server 626 may access additional context information for a consumer, specifying behavior definitions for the consumer, from a client profile service server 640. In addition, client profile service server 640 may provide definitions particular to a store or consumer environment. In addition, client profile service server 640 may monitor and provide additional information about a location of a consumer from monitored information such as the current location of the consumer, the current physical environment in which the consumer is located, and the events currently scheduled for a consumer. In one example, client profile service provider 640 monitors a consumer's electronic calendar or a consumer's current GPS location, for example, from the consumer's personal, portable telephony device.

Response processing service provider server 620 and response interpreter server 622 stream predicted response records, such as response records 420, to response-enabled applications via network 502. In the example embodiment, client system 606 includes a consumer interaction system 610 which is a response-enabled application, enabling client system 606 to determine and control signals such as outputs to a store attendant system or an interface within a consumer environment. Consumer interaction system 610 at client system 606 may receive predicted response records from client system 606, as captured by image capture system 608, or may receive predicted response records based on images and data detected by image capture system 608 or other image capture systems.

In addition, in the example embodiment, client service provider server 612 includes a consumer interaction system 614 which is a response-enabled service for enabling client service provider server 612 to determine and output control signals based on response records and other data. Client service provider server 612 represents a server that provides a consumer interaction service to one or more subscribing client systems. Consumer interaction system 614 may receive response records for a particular consumer environment from one or more systems and determine and output control signals to one or more client systems.

Figure 7:
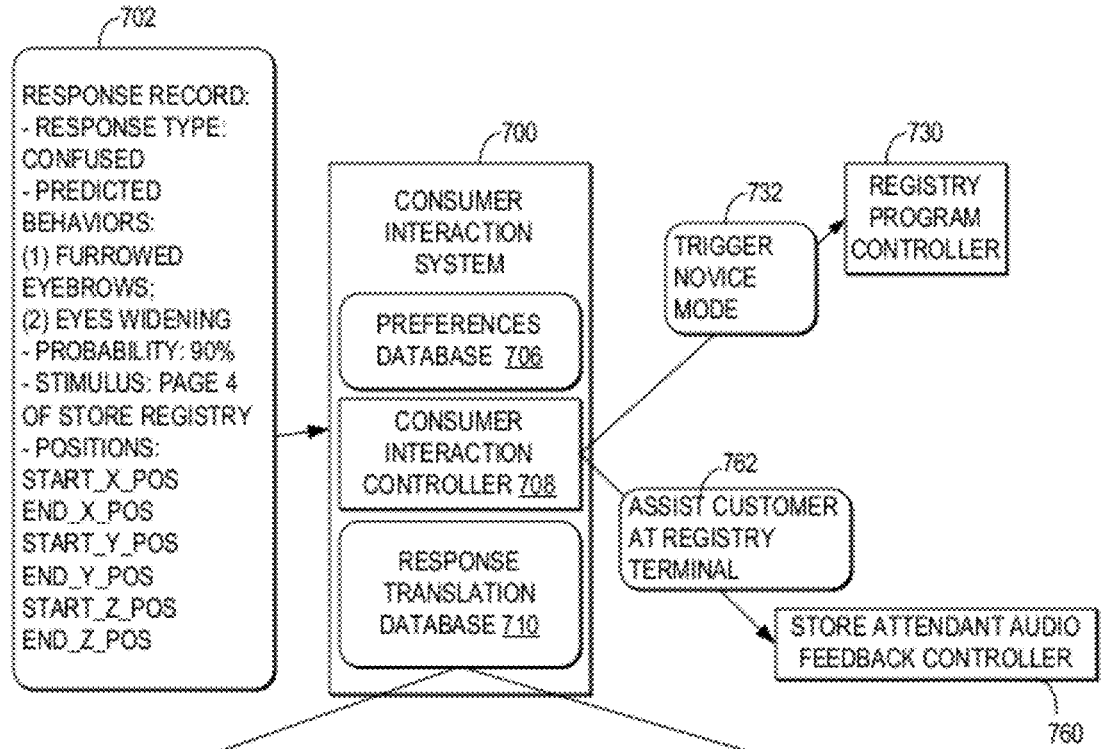
FIG. 7 is a block diagram illustrating one example of an implementation of a response interpreter system communicating with a response-enabled consumer interaction system.

With reference now to FIG. 7, a block diagram illustrates one example of an implementation of a response interpreter system communicating with a response-enabled consumer interaction system. Consumer interaction system 700 receives predicted behavior records from response processing system 100, which enables consumer interaction system 700 to provide control signals based on real-time, 3D images and other data captured within a consumer environment to adjust a consumer's experience of the consumer environment.

In particular, consumer interaction controller 708 of consumer interaction system 700 may base control signals on response records, such as response record 702. In addition, consumer interaction controller 708 may enhance or generate control signals based on other data, combined with the data included in response record 702. For example, consumer interaction controller 708 may access static or dynamic information about a consumer environment, through accessing floor maps, display maps, web site maps, photographs, video streams, RFID information, weather information and other data about a monitored consumer environment. In addition, consumer interaction controller 708 may access information about a consumer within a consumer environment, through other imaging devices. Then, consumer interaction controller 708 may generate a mapping of the predicted response records at locations within the monitored consumer environment.

In particular, in the example, consumer interaction system 700 receives response record 702 and consumer interaction controller 708 translates response record 702 into inputs that facilitate modeling of an environment and generation of control signals for potential adjustment of a consumer's experience within a consumer environment. In the embodiment depicted, in translating response record 702, consumer interaction controller 708 accesses response translation database 710 to translate one or more predicted responses, based on predicted behaviors, to a stimulus, into control signals based on the type of device to which the control signals will be output. In other embodiments, response records may be translated into other types of data usable by consumer interaction controller 708 for implementing a consumer interaction system. A preferences database 706 may specify additional preferences for selecting control signals for a particular consumer or a particular consumer environment. In addition, response translation database 710 may be associated with a particular consumer or particular consumer environment selected according to other criteria from among a selection of multiple response translation databases available to consumer interaction system 700.

In the example, response translation database 710 includes, for each entry, data specified in multiple categories. In particular, in the example, each entry includes a response type, a selection of predicted behaviors upon which the response type is based, a minimum (min) percentage probability that the response is accurately predicted, a stimulus responded to by the consumer. In addition, each entry includes instructions for generating control signals, if applicable, to each of a store attendant notification system, an output interface accessible to the consumer, or to other systems accessible to a consumer within a consumer environment. It will be understood that additional or alternate types of data may be included in response translation database 710 for translating response records into control signals.

In particular, in the example, a response type included in response record 702 includes a predicted response of "confused" by a consumer to a stimulus "page 4 of registry" with a 90% probability that the behaviors, which combined indicate the predicted response, are accurately predicted. Response record 702 is illustrative of, but not limiting of, the types of data and detail of data that may be included in a response record output by response processing system 100 and received by consumer interaction system 700. In one example, response record 702 may also include a percentage probability that the predicted type of response represents a consumer problem. In another example, response record 702 may only include the predicted behaviors and consumer interaction controller 708 then either predicts a response type or translates behaviors into control signals.

In the example, consumer interaction controller 708 may control output of control signals to one or more of the devices illustrated. For the example, consumer interaction controller 708 compares response record 702 with entry 720 of response translation database 710 and may generate control signals to one or more of a registry program controller 730 and a store attendant audio feedback controller 760 based on control signals generated from comparing response record 702 and other collected data with entry 720. It will be understood that consumer interaction controller 708 may output control signals to additional or alternate types of output devices and to multiple of a same type of output device.

In controlling control signals based on response record 702, in one example, consumer interaction controller 708 may determine that a control signal needs to be sent to trigger a novice mode, as illustrated at reference numeral 732, to registry program controller 730. For example, a registry program running at a kiosk may provide multiple modes of operation, such as a novice or beginner mode, a general mode, and an expert mode. Depending on the mode, registry program controller 730 adjusts the amount and detail of instructions displayed to the consumer for interacting with the registry kiosk service provided within a consumer environment, whether on-line or within a store. By switching to a novice mode, when the detected 3D image stream of a consumer accessing a registry program is indicated as "confused", the consumer's experience within the consumer environment is adjusted in an attempt to provide the consumer with additional assistance in using an electronic user interface.

Although not depicted, other examples of control signals for controlling a program for an output interface may include instructions to graphically adjust a portion of displayed content to highlight particular content, instructions to change the images of products or other images on an output interface, or instructions to adjust the types of outputs at an output interface, such as adding or removing an audio output signal.

In addition, in controlling control signals based on response record 702, in one example, consumer interaction controller 708 may determine that a control signal needs to be sent to trigger an audio message to one or more store attendants to prompt store attendants to provide additional assistance to the consumer using the registry service, as illustrated at reference numeral 762. If on-line, an on-line store attendant instant communication interface may be triggered and a store attendant assigned to communicate with the consumer via the instance message communication interface. If within a store environment, in the example, store attendant audio feedback controller 760 receives control signal 762 to assist the consumer at the registry terminal and store attendant audio feedback controller 760 determines a specific one or more store attendants wearing earpieces to which the message to assist the consumer at the registry terminal is output. In addition to controlling output of a message to assist a consumer, the control signal may also indicate the consumer's behavior or response which triggered the control signal. For example, if a consumer response indicates a consumer interest in a particular brand or material because the consumer has picked up multiple products of a same brand or material throughout a store, the control signal may prompt the store attendant with the consumer preferred brand or material.

In addition to entry 720, entries 722, 724, and 726 of response translation database 710 are further illustrative of types of entries that may be included in response translation database 710. For example, entry 722 specifies that for a response of "impatient" within minimum predicted probability of 70% and to a stimulus of "registry kiosk", if a store attendant is triggered, the store attendant is prompted to offer assistance to the consumer in locating products within the store environment and if the registry program is triggered, the registry program controller is directed to skip any pages within a sequence of pages that are only product advertisements.

Entries 724 and 726 are illustrative of entries that may trigger a control signal to another system other than a system with which the consumer is directly interacting. For example, entry 724 specifies that for a response of "impatient" within minimum predicted probability of 80% and a stimulus of "waiting in line for a registry kiosk", if a store attendant is triggered, the store attendant is prompted to check on the lines for the registry kiosk and if other systems are triggered, any systems within a store which could be implemented as a registry system, are triggered to operate as a registry system. For example, a register within a store environment may operate in one mode as a registry system and in another mode as a cash register, where consumer interaction controller 708 may generate a control signal for adjusting the operating mode and alerting a consumer to the change in mode. In addition, in the example, entry 726 specifies that for a response of "upset" with minimum predicted probability of 70% and a stimulus of "waiting in the check-out line", if a store attendant is triggered, the store attendant is prompted to send an additional employee to open an additional register, and if other systems are triggered, one or more self-checkout systems are triggered to open. In some store environments, a store attendant monitors a particular number of self-checkout systems to provide assistance to consumers, but self-checkout systems may be closed if there is not sufficient consumer use to afford positioning a store attendant to monitor the self-checkout systems. Consumer interaction controller 708, however, may send a control signal to open one or more closed self-checkout systems based on the current behaviors of consumers waiting in a checkout line to attempt to change a consumer's experience of the consumer environment.

It is important to note that in one example, response processing system 100 may automatically monitor one or more areas within a consumer environment or one or more online store servers and may automatically trigger prediction of consumer responses for each consumer entering within one of the areas within the consumer environment or accessing the online store interface. Examples of monitored areas within a consumer environment may include, but are not limited to, a selected area including a point of sale terminal, a selected area including a display within a store, and a selected area including a kiosk. In addition, consumer interaction system 700 may monitoring one or more areas within a consumer environment and trigger response processing system 100 to capture 3D image streams of a consumer and predict a consumer response of a consumer within the consumer environment.

Figure 8:
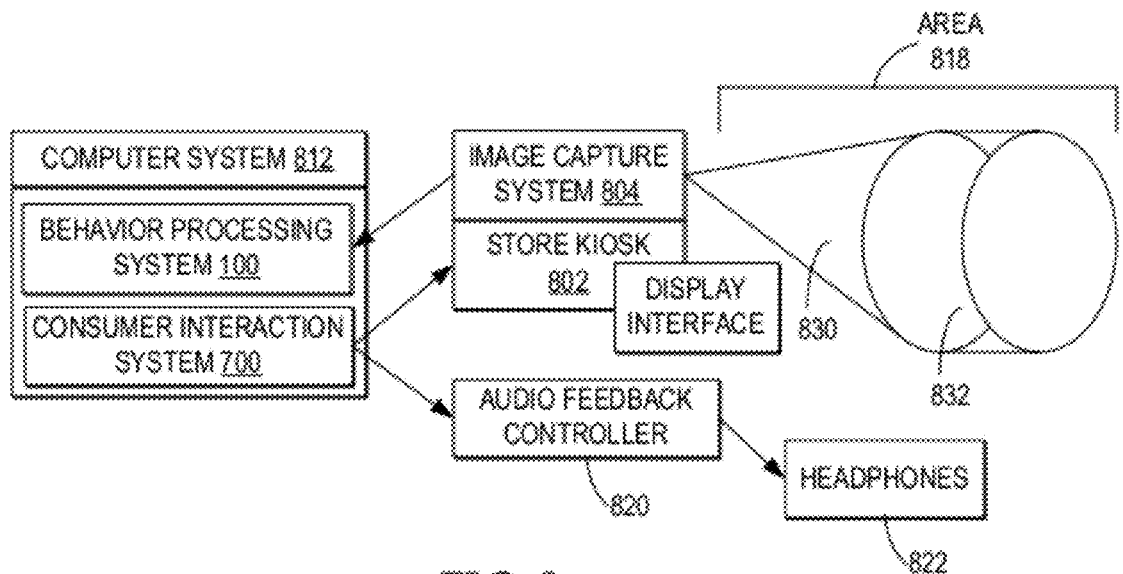
FIG. 8 is a block diagram depicting one example of an object detection interface and a consumer interaction interface within a store environment.

With reference now to FIG. 8, a block diagram illustrates one example of an object detection interface and a consumer interaction interface within a store environment.

In the example, FIG. 8 includes image capture system 804, which, in one example, include one or more of image capture device 202, image capture device 204, and sensor 240. Image capture system 804 captures a 3D image stream of the behaviors of a consumer within area 818, an audio stream of audio detectable within area 818, and data about the content displayed within a display interface 810 of store kiosk 802.

In particular, in the example, area 818 represents a consumer environment in which a consumer interacts with display interface 810 of store kiosk 802. Store kiosk 802, in one embodiment, provides a service to a consumer within a store environment. For example, store kiosk 802 may provide a registry service, a financial service, a check-out service, or other service provided to consumers within the store environment.

In the example, image capture system 804 and store kiosk 802 are illustrated in combination, separate from a computer system 812. In an alternate embodiment, image capture system 804 may be implemented within store kiosk 802. In another embodiment, image capture system 804 may capture 3D image streams, audio streams, and content display across multiple kiosks or areas within a consumer environment. Additionally, in another embodiment, computer system 812, image capture system 804, and store kiosk 802 may be implemented within a single physical unit or distributed across multiple systems communicatively connected by a network, such as network 502.

Computer system 812 includes a response processing system 100 and a consumer interaction system 700. Thus, response processing system 100 receives images and other data from image capture system 804 and generates a predicted response record. Consumer interaction system 700 receives the predicted response record and generates control signals for output to store kiosk 802 or an audio feedback controller 820. Store kiosk 802 includes a program controller for receiving control signals from consumer interaction system 700 and adjusting content displayed within display interface 810 to a consumer based on the control signals. Audio feedback controller 820 controls output of audio signals via a local wireless network to headphones worn by store attendants, such as headphones 822. It will be understood that response processing system 100 and consumer interaction system 700 are illustrated within a single computer system 812, computer system 812 may be distributed across a network of computer systems communicatively connected via network 502, for example.

In particular, more and more kiosks or other computer interfaces are provided within a store environment. By coupling image capture system 804 with store kiosk 802, the content displayed to a consumer within display interface 810 is adjusted not only in response to the selections made by the consumer, but also in an attempt to adjust a consumer's experience based on the behavior of the consumer indicative of a response to the consumer's interaction with store kiosk 802.

Additionally, in the example, response processing system 100 may track and predict responses to stimulus based on the consumer's proximity to the stimulus. In the example, response processing system 100 detects a 3D image stream of area 818, however, response processing system 100 tracks and interprets behaviors made by a consumer based on the section of area 818 in which the consumer behavior is made. For example, section 830 is closer to display interface 810 and section 832 is further away from display interface 810. A consumer behavior detected within section 830 of area 818 is more likely responsive to the content displayed within display interface 810. In contrast, a consumer behavior detected within section 832 of area 818 is more likely responsive to some stimulus other than the content displayed within display interface 810.

In one example, store kiosk 802 may provide a service to a consumer, but store kiosk 802 may also control display of advertising or survey questions. Based on the consumer's detected behavior through a 3D image stream captured by image capture system 804, store kiosk 802 may adjust the advertising or survey questions displayed for a particular consumer, to remove the additional material to an impatient consumer, to add additional material to a compliant consumer, or to change the material for a confused consumer.

In another example, as consumers move from store to store, consumers may be required to interact with different kiosks at each store, however, the content displayed in kiosks from store to store may vary. While some consumers may quickly adjust to and interact with different content and different series of questions at different interfaces from store to store, for many consumers, interacting with new and different content and interface arrangements at different stores may cause frustration or confusion. Thus, based on the consumer's detected behavior through a 3D image stream captured by image capture system 804, each store kiosk 802 may adjust the complexity of content displayed within an interface, the arrangement of content within an interface, or otherwise change the content displayed within an interface in an attempt to change a consumer's experience interacting with store kiosk 802.

Further, in another example, store kiosk 802 may only display content to a consumer, such as an entertainment display for showing product advertisements, videos, or other in-store promotion. The consumer does not directly interact with store kiosk 802, however, image capture system 804 capture the consumer's response to viewing the content displayed by store kiosk 802. In one example, if the consumer's behaviors indicate a response that the consumer is bored with the content displayed by store kiosk 802, store kiosk 802 may adjust the displayed content on display interface 810 in an attempt to change the consumer's experience to one of entertained, rather than bored.

Figure 9:
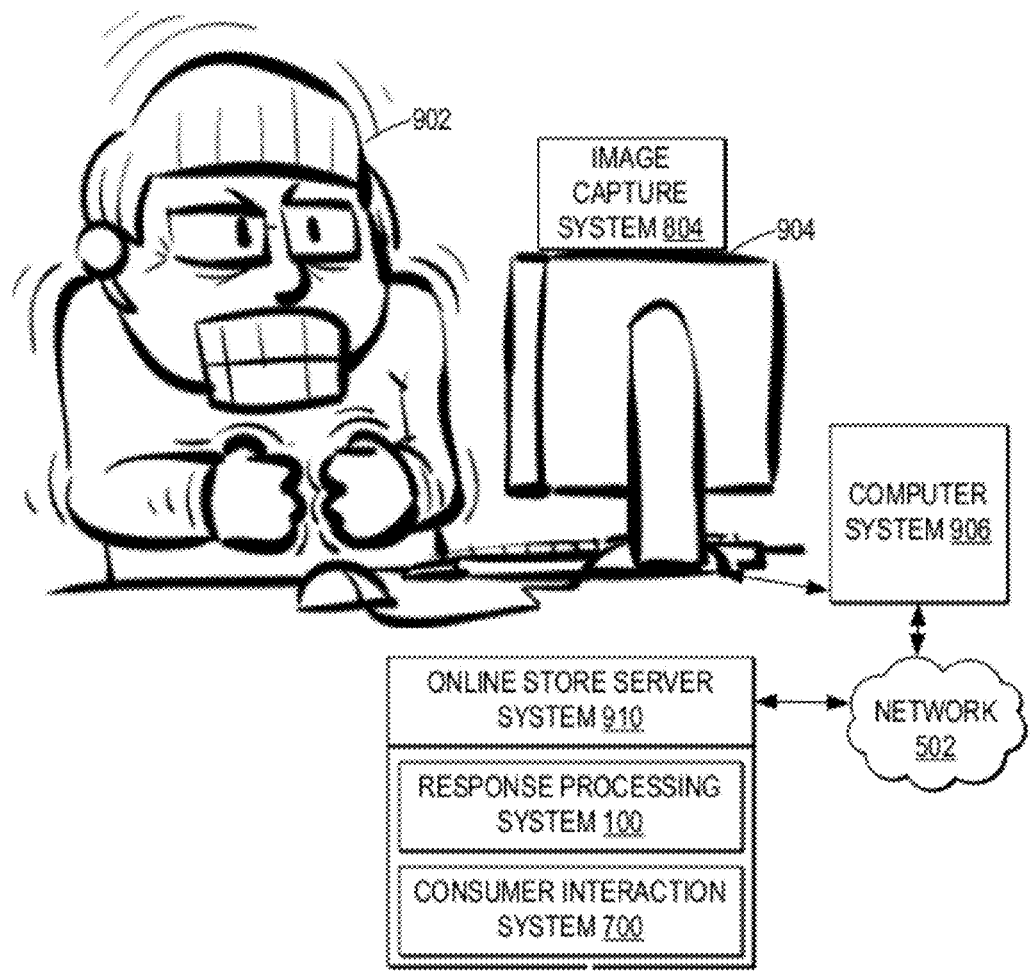
FIG. 9 is an illustrative diagram illustrating one example of a consumer interacting with an online consumer environment.

Referring now to FIG. 9, an illustrative diagram depicts one example of a consumer interacting with an online consumer environment. In the example, a consumer 902 interacts with an interface 904 of a computer system 906 through which an online store or other consumer environment is accessed via network 502 from one or more server systems, such as online store server 910. Image capture system 804 captures a 3D image stream of consumer 902 and other sensed data as consumer 902 responds to the content displayed within interface 904 as delivered by a store controller 912. In the illustration, the consumer's behavior includes gritted teeth tensed eyebrows, and shaking fists.

The captured 3D image stream and other sensed data are transmitted to online store server 910. Online store server 910 passes the 3D image stream and other sensed data to response processing system 100. Response processing system 100 determines a predicted response record. In the example, a predicted response record may indicate, based on the detected behaviors, that the consumer is irritated by the displayed content for some reason. Examples of stimulus that may cause a consumer irritation while viewing online store content include, but are not limited to, a consumer continuing to receive error messages when trying to fill out a form, a consumer closing pop-up ads, video or music, or another action where the consumer is impeded in moving to a next page within an online store.

Consumer interaction system 700 generates control signals, based on the predicted response record, for directing store controller 912 to adjust the content delivered to computer system 906 for output via interface 904 to consumer 902. While in the embodiment depicted, response processing system 100 and consumer interaction system 700 are depicted as components of online store server 910, it is important to note one or more of response processing system 100 and consumer interaction system 700 may be provided as services to online store server 910 and that each of the systems may be distributed across a network as illustrated in FIG. 6.

Figure 10:
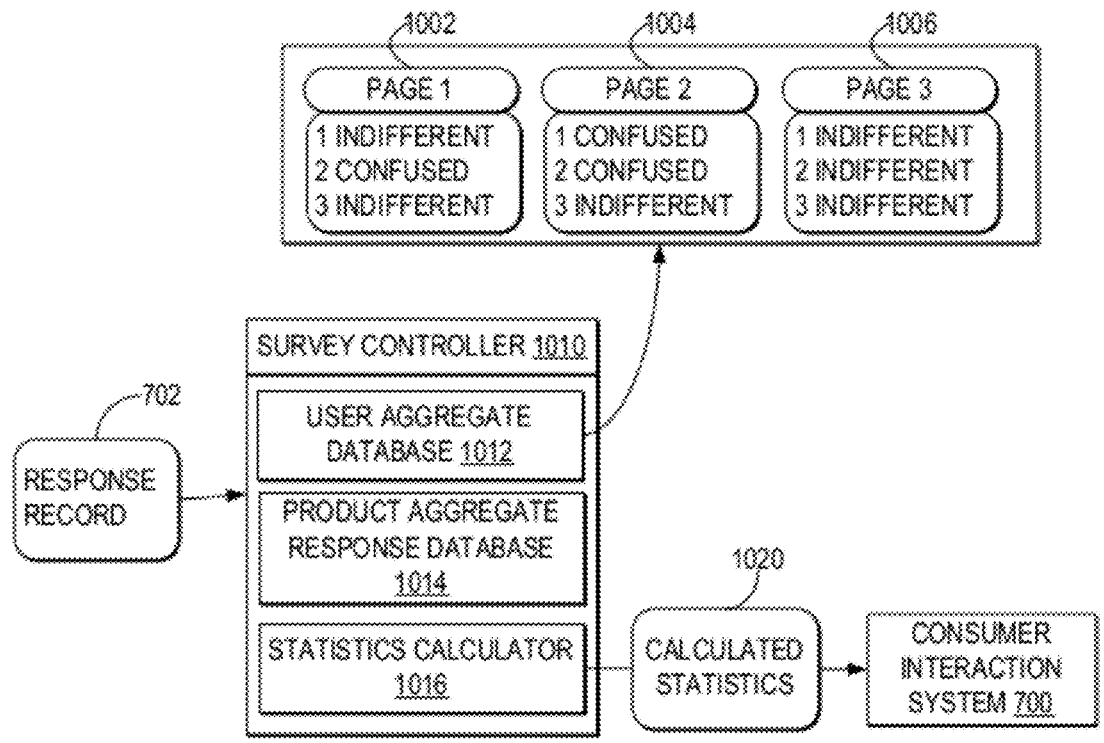
FIG. 10 is a block diagram illustrating a survey controller for aggregating consumer responses to a particular stimulus.

With reference now to FIG. 10, a block diagram illustrates a survey controller for aggregating consumer responses to a particular stimulus. In the example, the response-enabled application is a survey controller 1010. Survey controller 1010 receives response records from response processing systems, such as response record 702 from response processing system 100. Survey controller 1010 includes a user aggregate response database 1012 for storing received response records. In addition, survey controller 1010 includes a statistic calculator 1016 for calculating, from multiple consumer response records, statistics associated with consumer responses to a particular stimulus within a consumer environment. Survey controller 1010 includes a product aggregate response database 1014 for storing the calculated statistics.

In one example, survey controller 1010 calculates statistics for consumer responses to a particular stimulus within a consumer environment and transmits calculated statistics 1020 to consumer interaction system 700. Consumer interaction system 700 may determine control signals based on calculated statistics 1020. In addition, consumer interaction system 700 may adjust levels and requirements within response translation database 710 based on calculated statistics 1020.

In other examples, survey controller 1010 may update other systems via network 502 with calculated statistics. Further, survey controller 1010 may process statistics results and generate control signals for controlling other systems, such as for controlling an application that controls the content output to a consumer at a consumer interface.

In the example, aggregated responses are tracked for each display page of a sequence of display pages implemented in a financial check-out system. In the example, for each of the pages, as illustrated at reference numerals 1002, 1004, and 1006, the responses of multiple consumers to each page are recorded. By aggregating the responses of multiple consumers to a same page, statistic calculator 1016 can predict how consumers in the future will respond to the same page, detect when consumer behavior indicates an acceptance of particular content, and calculate other group response indicators.

Although not depicted, in another example, statistic calculator 1016 may aggregate the responses of a single consumer to a same page on different days when the consumer interacts with the page. By monitoring a same consumer's response to a page, statistic calculator 1016 may monitor a reaction by a consumer to the same content and predict when the content needs to be changed or identify how many times a consumer views the same content before showing behaviors that indicate understanding of the content.

Figure 11:
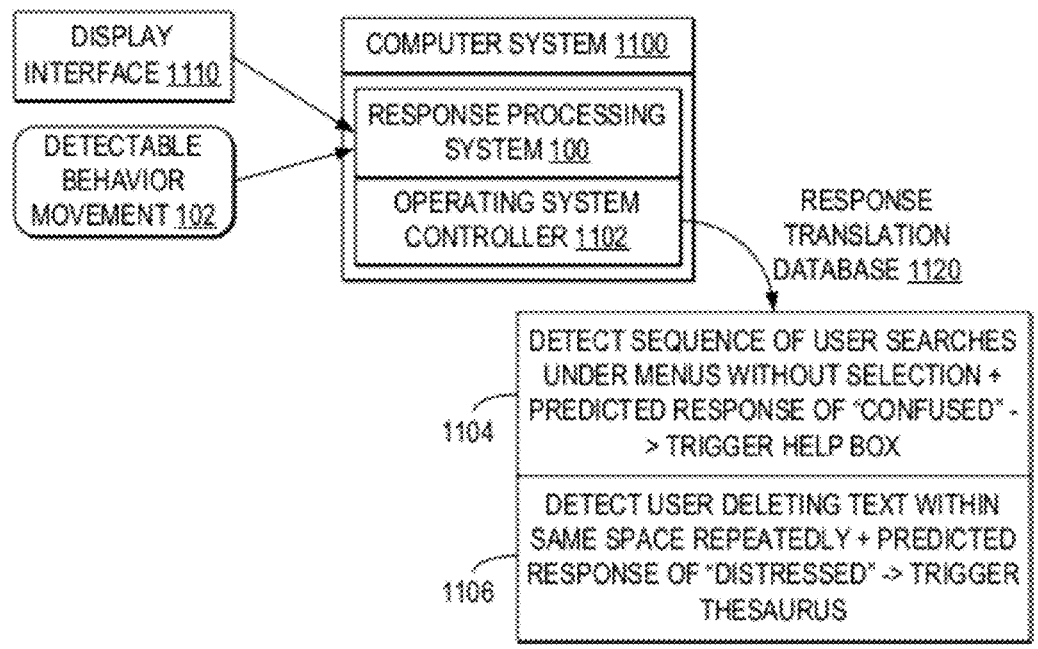
FIG. 11 is a high level logic flowchart illustrating a process and program for a response-enabled operating system for adjusting content based on consumer behavior responsive to operations controlled by the operating system.

Referring now to FIG. 11, a block diagram illustrates a response-enabled operating system for adjusting content based on consumer behavior responsive to operations controlled by the operating system. In the example, an operating system controller 1102 for a computer system 1100 receives predicted response records from response processing system 100. In the example, response processing system 100 detects detectable behavior movement 102 within a consumer environment through detecting a 3D image stream and other data about a consumer. In addition, response processing system 100 detects the contents of display interface 1110 to which detected consumer behavior is responsive.

In the example, operating system controller 1102 receives predicted response records from response processing system 100 and generates control signals for adjusting the performance of the operating system or applications run by the operating system, based on entries in a response translation database 1120. In the example, response translation database 1120 includes a first entry 1104 for directing that if a response record indicates a consumer behavior is "confused" and the consumer stimulus includes a sequence of searching menus without making selections, then a control signal should be generated to trigger the operating system or application help function. In addition, in the example, response translation database 1120 includes a second entry 1106 for directing that if a response record indicates a consumer behavior is "distressed" and the consumer stimulus includes the user deleting words typed in the same space within a document multiple times, then a control signal should be generated to trigger the operating system or application thesaurus. It will be understood that in additional or alternate types of entries within response translation database, a consumer's behavior based response coupled with consumer activity at a computer system may trigger an operating system to perform additional functions or commands of the operating system or an application.

By enabling operating system controller 1102 to respond to predicted response records from response processing system 100, a consumer's detected behaviors influence how operating system controller 1102 controls a computer system. In addition to generating control signals to control the operating system and application at a computer system, operating system controller 1102 may generate and send control signals to a server system via a network, wherein the control signals direct the client or server system to adjust the content delivered to the computer system controlled by operating system controller 1102.

Figures 12, 13:
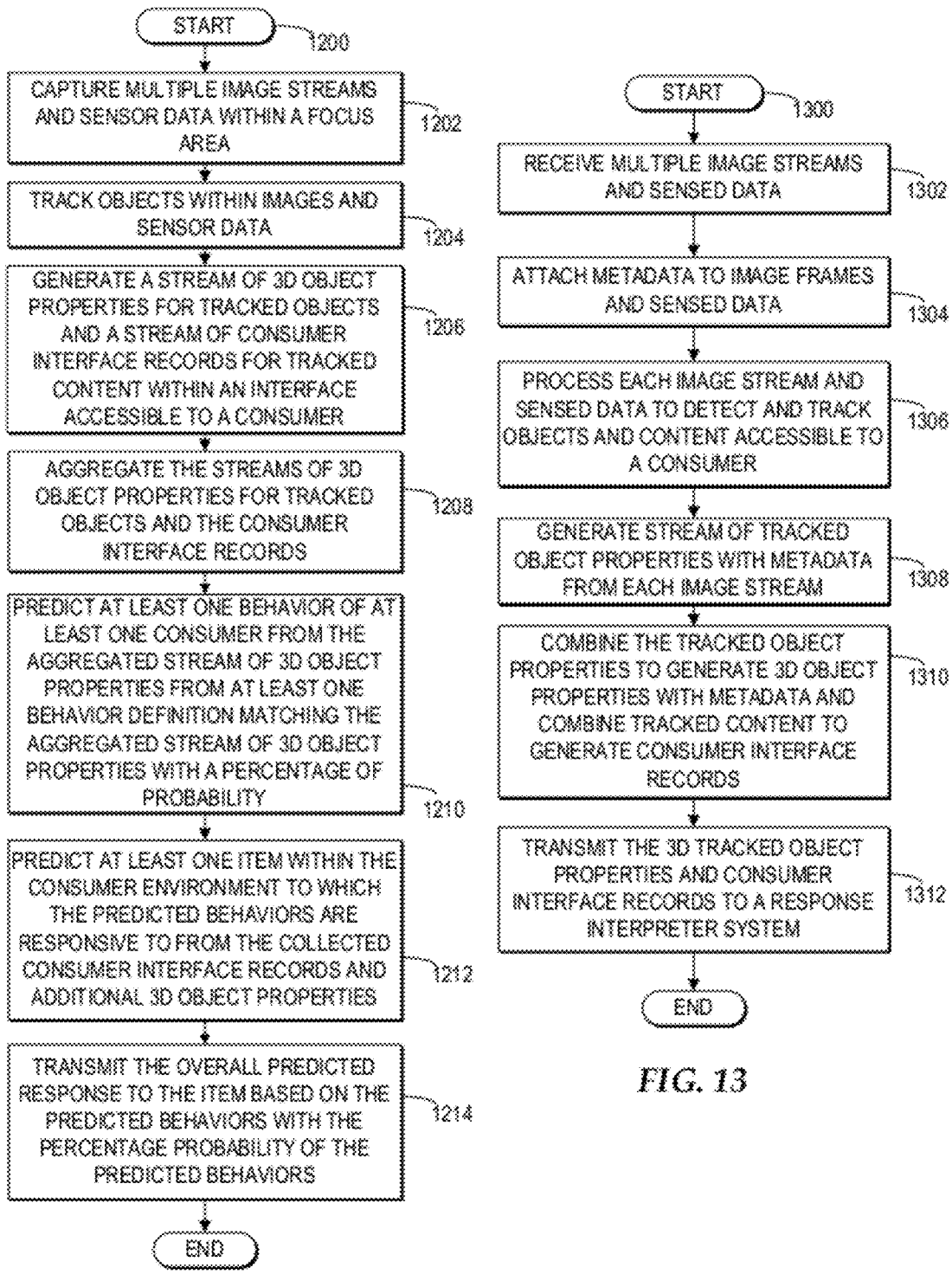
FIG. 12 is a high level logic flowchart depicting a process and program for a response processing system to predict response types and stimulus responded to with a percentage probability.
FIG. 13 is a high level logic flowchart illustrating a process and program for response detection by tracking objects within image streams and other sensed data and generating 3D object properties for the tracked objects representative of behaviors and generating consumer interface records indicative of any content accessible to the consumer at an interface within the consumer environment

Referring now to FIG. 12, a high level logic flowchart depicts a process and program for a response processing system to predict response types and stimulus responded to with a percentage probability. In the example, the process starts at block 1200, and thereafter proceeds to block 1202. Block 1202 depicts capturing, via a stereoscopic image device, multiple image streams and via sensors, sensor data, within a focus area. Next, block 1204 illustrates tracking objects within the images and sensor data. Thereafter, block 1206 depicts generating a stream of 3D object properties for tracked objects and a stream of consumer interface records for tracked content within an interface accessible to a consumer. Thereafter, block 1208 depicts aggregating the 3D object properties for each of the tracked objects and the consumer interface records. In particular, the aggregated 3D object properties represent one or more objects tracked in association with at least one consumer representative of behaviors of the at least one consumer and products or other detectable objects within the consumer environment.

Next, block 1210 illustrates predicting at least one type of behavior from the aggregated stream of 3D object properties from one or more behavior definitions that match the aggregated stream of 3D object properties with a percentage probability. In addition, next, block 1212 depicts predicting at least one stimulus within the consumer environment to which the predicted behaviors are responsive to from the collected consumer interface records and additional 3D object properties which when compared with product definitions identify a product within the consumer environment. Thereafter, block 1214 depicts transmitting each overall predicted response to the predicted stimulus based on the predicted behaviors with the percentage probability that the predicted behaviors are accurately predicted, and the process ends.

With reference now to FIG. 13, a high level logic flowchart depicts a process and program for response detection by tracking objects within image streams and other sensed data and generating 3D object properties for the tracked objects representative of behaviors and generating consumer interface records indicative of any content accessible to the consumer at an interface within the consumer environment. As illustrated, the process starts at block 1300 and thereafter proceeds to block 1302. Block 1302 depicts an object detector system receiving multiple image streams, via one or more image capture devices, and sensed data, via one or more sensors. Next, block 1304 illustrates the object detector system attaching metadata to the image frames and sensed data, and the process passes to block 1306. In one example, metadata includes data such as, but not limited to, a camera identifier, frame number, timestamp, and pixel count.

Block 1306 depicts the object detector system processing each image stream and sensed data to detect and track objects, wherein objects may include physical objects and consumer movement indicative of a behavior, and to detect and track content accessible to a consumer at an interface within the consumer environment. Next, block 1308 illustrates generating streams of tracked object properties with metadata from each image stream. Thereafter, block 1310 depicts combining the tracked object properties to generate 3D object properties with metadata and combining the tracked content accessible to a consumer to generate consumer interface records. Next, block 1312 illustrates transmitting the 3D tracked object properties and consumer interface records to a response interpreter system, and the process ends.

Referring now to FIG. 14, a high level logic flowchart depicts a process and program for response prediction from tracked 3D object properties and consumer interface records. In the example, the process starts at block 1400 and thereafter proceeds to block 1402. Block 1402 depicts a determination whether the response interpreter system receives 3D object properties. When the response interpreter system receives 3D object properties, then the process passes to block 1404. In addition to receiving 3D object properties, the response interpreter system may receive consumer interface records.

Block 1404 depicts accessing a range of applicable definitions, and the process passes to block 1406. Applicable definitions may include behavior definitions, product definitions, and voice stress definitions. Block 1406 illustrates the response interpreter system comparing the 3D object properties for tracked objects with the applicable definitions. Next, block 1408 depicts the response interpreter system detecting one or more behavior definitions and product definitions with a closest match to one or more sets of 3D object properties. Thereafter, block 1410 illustrates calculating a percentage probability that the 3D object properties match the selected definitions. Next, block 1412 depicts predicting from any predicted products and any consumer interface records at least one stimulus within the consumer environment to which the consumer behavior is responsive. Thereafter, block 1414 illustrates generating at least one predicted behavior record with any predicted behavior, percentage probability that the predicted behavior is correct, percentage probability that the predicted behavior is potentially adverse, and other sensed data. Next, block 1416 depicts transmitting the predicted response records to a particular response-enabled application, and the process ends.

With reference now to FIG. 15, a high level logic flowchart depicts a process and program for applying a predicted behavior record in a response-enabled consumer interaction system. As illustrated, the process starts at block 1500 and thereafter proceeds to block 1502. Block 1502 depicts a determination whether a response-enabled consumer interaction system receives a predicted response record. When the consumer interaction system receives a predicted response record, then the process passes to block 1504. Block 1504 illustrates collecting other data associated with the consumer environment. Next, block 1508 illustrates translating the predicted response records and other collected data into one or more control signals for attempting to adjust the consumer's experience within the consumer environment. Thereafter, block 1510 illustrates controlling output of the control signals to the selected output controllers, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for managing responses, comprising:
receiving, by a survey controller, a plurality of response records from a plurality of response processing systems, wherein the plurality of response records comprises a selection of response records each identifying a separate response of at least one consumer to a particular stimulus from among a plurality of stimulus within a consumer environment detected from a three-dimensional movement of the at least one consumer captured within the consumer environment;
storing, by the survey controller, the plurality of response records in a response database;
calculating, by the survey controller, from the selection of response records stored in the response database, statistics associated with the particular stimulus within the consumer environment; and
storing, by the survey controller, the calculated statistics.

2. The method according to claim 1, wherein receiving, by a survey controller, a plurality of response records from a plurality of response processing systems, wherein the plurality of response records comprises a selection of response records each identifying a separate response of at least one consumer to a particular stimulus from among a plurality of stimulus within a consumer environment, further comprises:
receiving, by the survey controller, the plurality of response records from the plurality of response processing systems by:
capturing, by each of the plurality of response processing systems, a separate three-dimensional movement of a separate one of the at least one consumer within the consumer environment, wherein each separate three-dimensional movement is determined using at least one image capture device aimed at the separate one of the at least one consumer;
identifying the particular location of the separate at least one consumer within the consumer environment from among a plurality of locations within the consumer environment;
accessing a plurality of behavior definitions and a plurality of product definitions specified for the particular location of the consumer environment from among a definition database comprising a plurality of separate selections of behavior definitions and product definitions specified for a plurality of consumer environments at a plurality of locations;
identifying at least one particular behavior definition from among the plurality of behavior definitions specified for the particular location of the consumer environment matching a plurality of consumer movement positions of the consumer detected within a three-dimensional object properties stream of the captured movement;
identifying at least one particular product definition from among the plurality of product definitions specified for the particular location of the consumer environment matching a plurality of product positions of at least one object detected within the three-dimensional object properties stream of the captured movement; and
predicting at least one behavior of the consumer from the at least one particular behavior definition in response to the particular stimulus predicted from the at least one particular product definition within the consumer environment.

3. The method according to claim 2, further comprising:
detecting whether the at least one behavior of the consumer indicates a type of response to the particular stimulus requiring adjustment of the consumer environment by comparing the type of response indicated by the at least one behavior with a plurality of response rules and identifying at least one particular response rule applicable for the type of response to the particular stimulus; and responsive to detecting that the behavior of the consumer indicates a type of response to the particular stimulus requiring adjustment of the consumer environment, generating a control signal according to the particular response rule to trigger at least one change of the particular stimulus within the consumer environment.

4. The method according to claim 1, further comprising:
detecting whether the calculated statistics indicate a level of response to the particular stimulus requiring adjustment of the consumer environment by comparing the calculated statistics with a plurality of response rules and identifying at least one particular response rule applicable for the particular stimulus; and
responsive to detecting that calculated statistics indicates the level of response to the particular stimulus requiring adjustment of the consumer environment, generating a control signal according to the particular response rule to trigger at least one change of the particular stimulus within the consumer environment.

5. The method according to claim 4, wherein responsive to detecting that calculated statistics indicates the level of response to the particular stimulus requiring adjustment of the consumer environment, generating a control signal according to the particular response rule to trigger at least one change of the particular stimulus within the consumer environment, further comprises:
generating the control signal to control an application that controls the content output to the at least one consumer at at least one consumer accessible interface.

6. The method according to claim 1, wherein calculating, by the survey controller, from the selection of response records stored in the response database, statistics associated with the particular stimulus within the consumer environment, further comprises:
calculating, by the survey controller, from the selection of response records stored in the response database to the particular stimulus comprising a plurality of display pages of a sequence of display pages implemented in a financial check-out system, a predicted reaction by the at least one consumer to the plurality of display pages on a subsequent visit to the plurality of display pages and an acceptance rate by the at least one consumer of particular content on the plurality of display pages.

7. The method according to claim 1, wherein calculating, by the survey controller, from the selection of response records stored in the response database, statistics associated with the particular stimulus within the consumer environment, further comprises:
calculating, by the survey controller, from the selection of response records stored in the response database to the particular stimulus comprising a particular web page with a same content viewed by the at least one consumer on at least two different days, a predicted need to change the content on the particular web page and a predicted identification of a number of times the at least one consumer views the same content before showing behaviors that indicate an understanding of the content.

8. A system for managing responses, comprising:
a survey controller operative on a processor to receive a plurality of response records from a plurality of response processing systems, wherein the plurality of response records comprises a selection of response records each identifying a separate response of at least one consumer to a particular stimulus from among a plurality of stimulus within a consumer environment detected from a three-dimensional movement of the at least one consumer captured within the consumer environment;
the survey controller operative to store the plurality of response records in a response database;
the survey controller operative to calculate, from the selection of response records stored in the response database, statistics associated with the particular stimulus within the consumer environment; and
the survey controller operative to store the calculated statistics.

9. The system according to claim 8, wherein the survey controller operative on a processor to receive a plurality of response records from a plurality of response processing systems, wherein the plurality of response records comprises a selection of response records each identifying a separate response of at least one consumer to a particular stimulus from among a plurality of stimulus within a consumer environment, further comprises:
the survey controller operative to receive the plurality of response records from the plurality of response processing systems by:
capturing, by each of the plurality of response processing systems, a separate three-dimensional movement of a separate one of the at least one consumer within the consumer environment, wherein each separate three-dimensional movement is determined using at least one image capture device aimed at the separate one of the at least one consumer
identifying the particular location of the separate at least one consumer within the consumer environment from among a plurality of locations within the consumer environment;
accessing a plurality of behavior definitions and a plurality of product definitions specified for the particular location of the consumer environment from among a definition database comprising a plurality of separate selections of behavior definitions and product definitions specified for a plurality of consumer environments at a plurality of locations;
identifying at least one particular behavior definition from among the plurality of behavior definitions specified for the particular location of the consumer environment matching a plurality of consumer movement positions of the consumer detected within a three-dimensional object properties stream of the captured movement;
identifying at least one particular product definition from among the plurality of product definitions specified for the particular location of the consumer environment matching a plurality of product positions of at least one object detected within the three-dimensional object properties stream of the captured movement; and
predicting at least one behavior of the consumer from the at least one particular behavior definition in response to the particular stimulus predicted from the at least one particular product definition within the consumer environment.

10. The system according to claim 9, further comprising:
the survey controller operative to detect whether the at least one behavior of the consumer indicates a type of response to the particular stimulus requiring adjustment of the consumer environment by comparing the type of response indicated by the at least one behavior with a plurality of response rules and identifying at least one particular response rule applicable for the type of response to the particular stimulus; and
the survey controller, responsive to detecting that the behavior of the consumer indicates a type of response to the particular stimulus requiring adjustment of the consumer environment, operative to generate a control signal according to the particular response rule to trigger at least one change of the particular stimulus within the consumer environment.

11. The system according to claim 8, further comprising:
the survey controller operative to detect whether the calculated statistics indicate a level of response to the particular stimulus requiring adjustment of the consumer environment by comparing the calculated statistics with a plurality of response rules and identifying at least one particular response rule applicable for the particular stimulus; and
the survey controller, responsive to detecting that calculated statistics indicates the level of response to the particular stimulus requiring adjustment of the consumer environment, operative to generate a control signal according to the particular response rule to trigger at least one change of the particular stimulus within the consumer environment.

12. The system according to claim 11, wherein the survey controller, responsive to detecting that calculated statistics indicates the level of response to the particular stimulus requiring adjustment of the consumer environment, operative to generate a control signal according to the particular response rule to trigger at least one change of the particular stimulus within the consumer environment, further comprises:
the survey controller operative to generate the control signal to control an application that controls the content output to the at least one consumer at at least one consumer accessible interface.

13. The system according to claim 8, wherein the survey controller operative to calculate, from the selection of response records stored in the response database, statistics associated with the particular stimulus within the consumer environment, further comprises:
the survey controller operative to calculate, from the selection of response records stored in the response database to the particular stimulus comprising a plurality of display pages of a sequence of display pages implemented in a financial check-out system, a predicted reaction by the at least one consumer to the plurality of display pages on a subsequent visit to the plurality of display pages and an acceptance rate by the at least one consumer of particular content on the plurality of display pages.

14. The system according to claim 8, wherein the survey controller operative to calculate, from the selection of response records stored in the response database, statistics associated with the particular stimulus within the consumer environment, further comprises:
the survey controller operative to calculate, from the selection of response records stored in the response database to the particular stimulus comprising a particular web page with a same content viewed by the at least one consumer on at least two different days, a predicted need to change the content on the particular web page and a predicted identification of a number of times the at least one consumer views the same content before showing behaviors that indicate an understanding of the content.

15. A computer program product for managing responses, the computer program product comprising a non-transitory computer readable storage medium having program code embodied therewith, the program code executable by a computer to:

receive, by the computer, a plurality of response records from a plurality of response processing systems, wherein the plurality of response records comprises a selection of response records each identifying a separate response of at least one consumer to a particular stimulus from among a plurality of stimulus within a consumer environment detected from a three-dimensional movement of the at least one consumer captured within the consumer environment;
store, by the computer, the plurality of response records in a response database;
calculate, by the computer, from the selection of response records stored in the response database, statistics associated with the particular stimulus within the consumer environment; and
store, by the computer, the calculated statistics.

16. The computer program product according to claim 15, further comprising the program code executable by the computer to:
detect, by the computer, whether the calculated statistics indicate a level of response to the particular stimulus requiring adjustment of the consumer environment by comparing the calculated statistics with a plurality of response rules and identifying at least one particular response rule applicable for the particular stimulus; and
responsive to detecting that calculated statistics indicates the level of response to the particular stimulus requiring adjustment of the consumer environment, generate, by the computer, a control signal according to the particular response rule to trigger at least one change of the particular stimulus within the consumer environment.

17. The computer program product according to claim 16, further comprising the program code executable by the computer to:
generate, by the computer, the control signal to control an application that controls the content output to the at least one consumer at at least one consumer accessible interface.

18. The computer program product according to claim 15, further comprising the program code executable by the computer to:
calculate, by the computer, from the selection of response records stored in the response database to the particular stimulus comprising a plurality of display pages of a sequence of display pages implemented in a financial check-out system, a predicted reaction by the at least one consumer to the plurality of display pages on a subsequent visit to the plurality of display pages and an acceptance rate by the at least one consumer of particular content on the plurality of display pages.

19. The computer program product according to claim 15, further comprising the program code executable by the computer to:
calculate, by the computer, from the selection of response records stored in the response database to the particular stimulus comprising a particular web page with a same content viewed by the at least one consumer on at least two different days, a predicted need to change the content on the particular web page and a predicted identification of a number of times the at least one consumer views the same content before showing behaviors that indicate an understanding of the content.

* * * * *